(12) United States Patent
Nakano et al.

(10) Patent No.: US 11,618,401 B2
(45) Date of Patent: Apr. 4, 2023

(54) VEHICLE SYSTEM AND TRAVELING UNIT

(71) Applicant: TOYOTA JIDOSHA KABUSHIKI KAISHA, Toyota (JP)

(72) Inventors: Yuki Nakano, Nisshin (JP); Masato Ura, Nisshin (JP); Koji Takao, Toyota (JP); Hideyuki Sakurai, Toyota (JP); Keisuke Hotta, Miyoshi (JP); Rieko Masutani, Toyota (JP); Atsushi Hanawa, Miyoshi (JP); Masanobu Ohmi, Kasugai (JP); Takashi Hayashi, Nagoya (JP); Atsushi Nabata, Nagakute (JP); Tetsuro Sakaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 17/108,092

(22) Filed: Dec. 1, 2020

(65) Prior Publication Data

US 2021/0170973 A1 Jun. 10, 2021

(30) Foreign Application Priority Data

Dec. 10, 2019 (JP) .............................. JP2019-223008

(51) Int. Cl.
*B60R 21/0134* (2006.01)
*B62D 24/00* (2006.01)

(52) U.S. Cl.
CPC .......... *B60R 21/0134* (2013.01); *B62D 24/00* (2013.01)

(58) Field of Classification Search
CPC ... B60R 21/0134; B60R 21/013; B60R 21/02; B60R 2021/0273; B62D 24/00; B62D 25/00
See application file for complete search history.

(56) References Cited

U.S. PATENT DOCUMENTS

2022/0017166 A1* 1/2022 Delise ..................... B60K 1/00

FOREIGN PATENT DOCUMENTS

| CN | 107521383 A | 12/2017 |
|---|---|---|
| JP | 2000-16209 A | 1/2000 |
| JP | 2008-222174 A | 9/2008 |
| JP | 2015-077949 A | 4/2015 |

* cited by examiner

*Primary Examiner* — Yuen Wong
(74) *Attorney, Agent, or Firm* — Oliff PLC

(57) ABSTRACT

There is provided a vehicle system including: a body unit; a traveling unit capable of traveling with the body unit being mounted thereon; coupling units configured to couple the body unit and the traveling unit; a sensor used for predicting a crash; a controller configured to execute causing coupling between the traveling unit and the body unit by the coupling units to be released when a crash is predicted based on a detection value of the sensor; an acting unit provided on one of the traveling unit and the body unit and configured to act so that a positional relationship between the body unit and the traveling unit is changed when the coupling is released; and an acted-upon unit provided on the other between the traveling unit and the body unit and configured to receive action of the acting unit.

14 Claims, 20 Drawing Sheets

FIG. 9
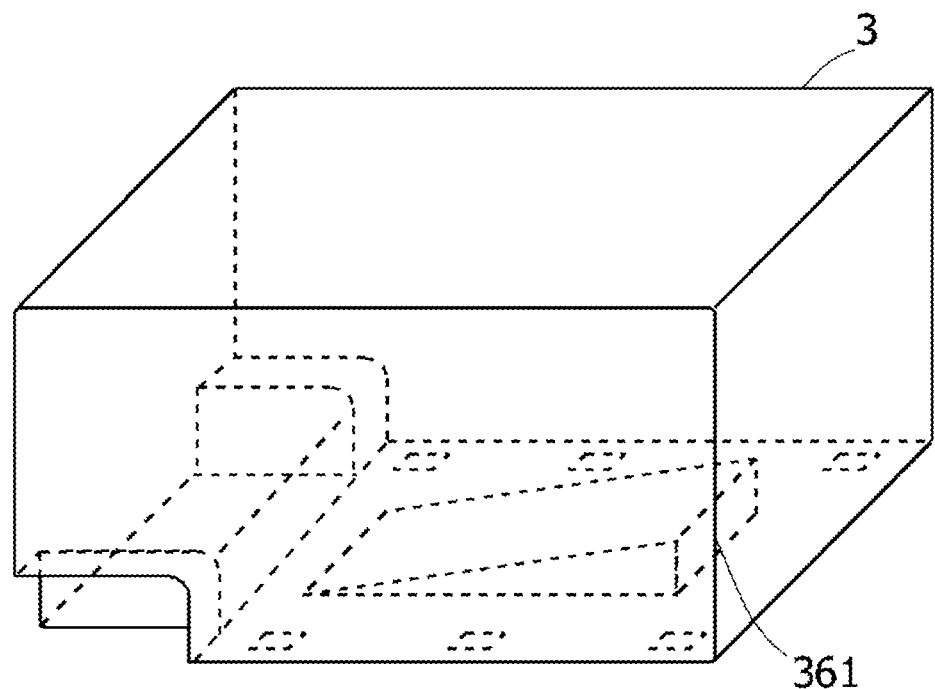
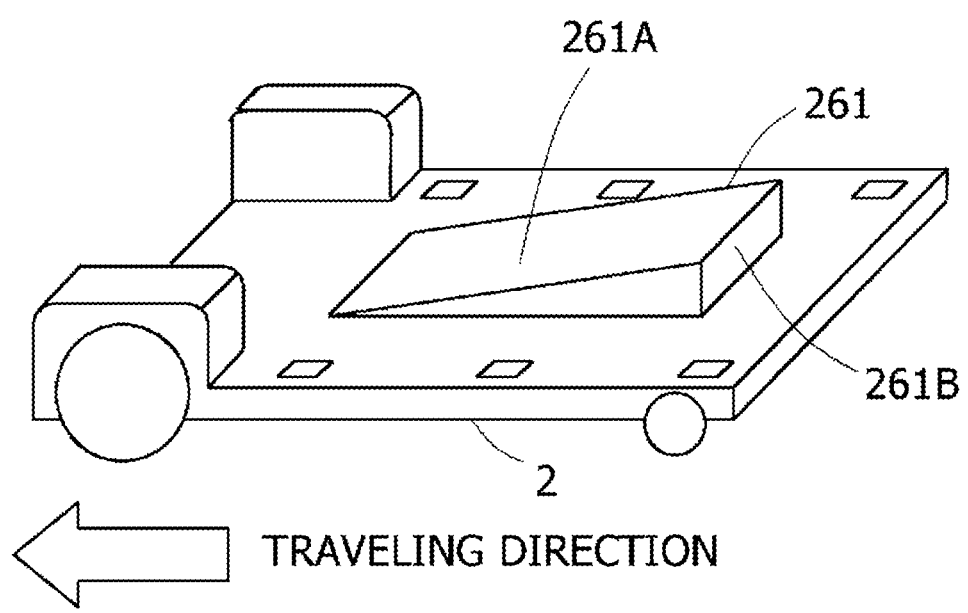
TRAVELING DIRECTION

FIG. 12
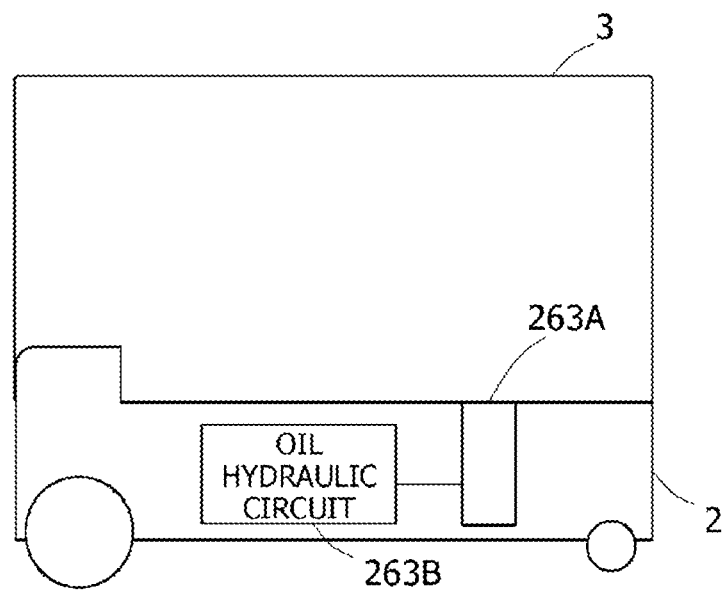
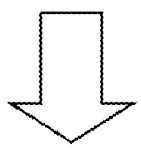
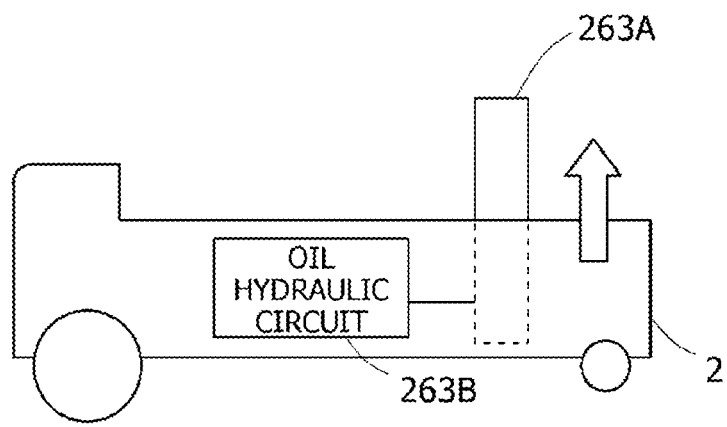

FIG. 16
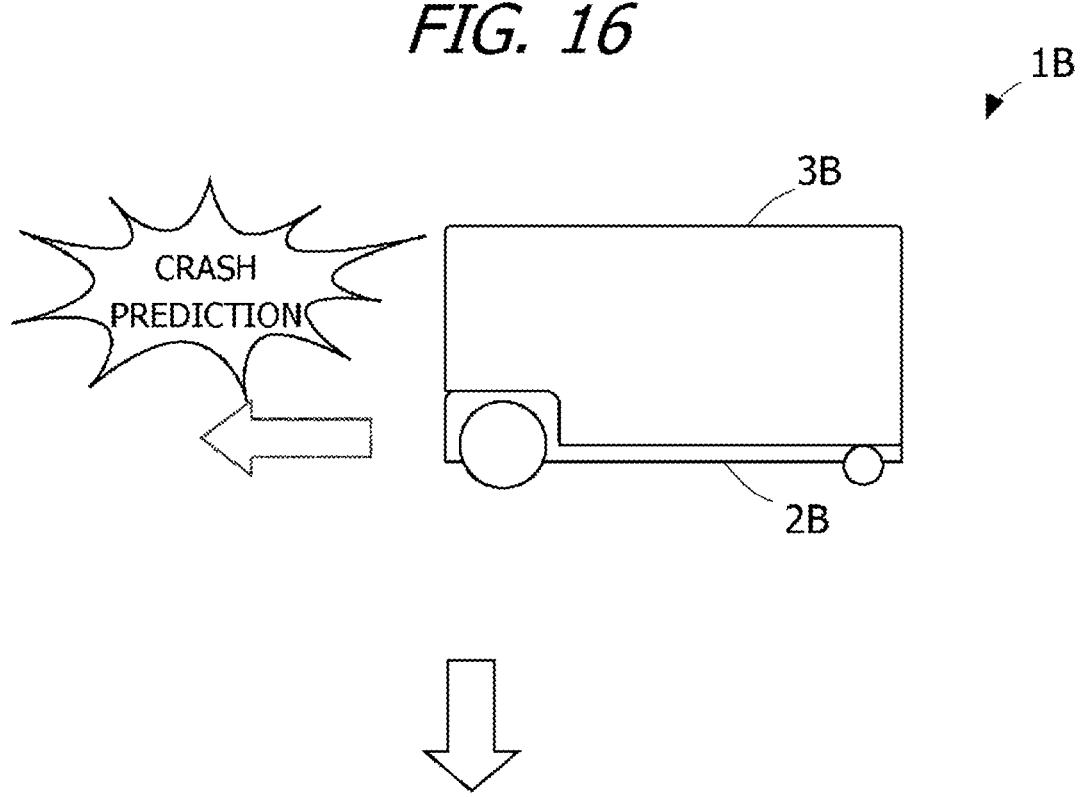
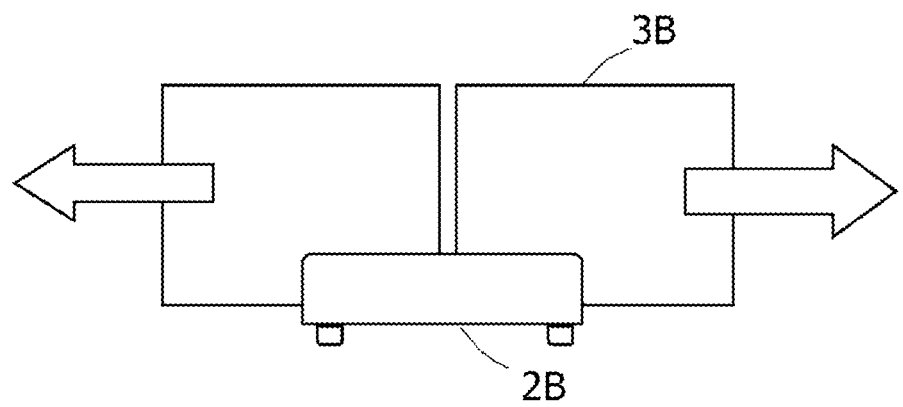

VEHICLE SYSTEM AND TRAVELING UNIT

CROSS REFERENCE TO RELATED APPLICATION

This application claims the benefit of Japanese Patent Application No. 2019-223008, filed on Dec. 10, 2019, which is hereby incorporated by reference herein in its entirety.

BACKGROUND

Technical Field

The present disclosure relates to a vehicle system and a traveling unit.

Description of the Related Art

There is disclosed a dress-up vehicle in which assembly points are provided on a vehicle body structure, and one body group selected from a plurality of body groups can be attached to a vehicle structure body by the assembly points (for example, Patent document 1).

CITATION LIST

Patent Document

[Patent document 1] Japanese Patent Laid-Open No. 2015-077949

A subject of one of aspects of the disclosure is to provide a vehicle system and a traveling unit that reduce an impact on an occupant by a crash accident in a vehicle from which a body unit can be separated.

SUMMARY

One aspect of the present disclosure is a vehicle system comprising:
a body unit;
a traveling unit capable of traveling with the body unit being mounted thereon;
coupling units configured to couple the body unit and the traveling unit;
a sensor used for predicting a crash;
a controller configured to execute causing coupling between the traveling unit and the body unit by the coupling units to be released when a crash is predicted based on a detection value of the sensor;
an acting unit provided on one of the traveling unit and the body unit and configured to act so that a positional relationship between the body unit and the traveling unit is changed when the coupling is released; and
an acted-upon unit provided on the other between the traveling unit and the body unit and configured to receive action of the acting unit.

Another aspect of the present disclosure is a traveling unit capable of traveling with a body unit being mounted thereon, the traveling unit comprising:
coupling units configured to be coupled with the body unit;
a sensor used for predicting a crash;
a controller configured to execute causing coupling with the body unit by the coupling units to be released when a crash is predicted based on a detection value of the sensor; and
an acting unit configured to act so that a positional relationship with the body unit is changed when the coupling is released.

According to the present disclosure, it is possible to, in a vehicle from which a body unit can be separated, reduce an impact on an occupant by a crash accident.

BRIEF DESCRIPTION OF DRAWINGS

FIG. 9 is a diagram illustrating examples of a configuration of a stopper;

FIG. 12 is a diagram illustrating examples of a configuration of a stopper;

FIG. 16 is a diagram illustrating an example of a configuration of a vehicle according to a second embodiment;

DESCRIPTION OF THE EMBODIMENTS

Figure 1:
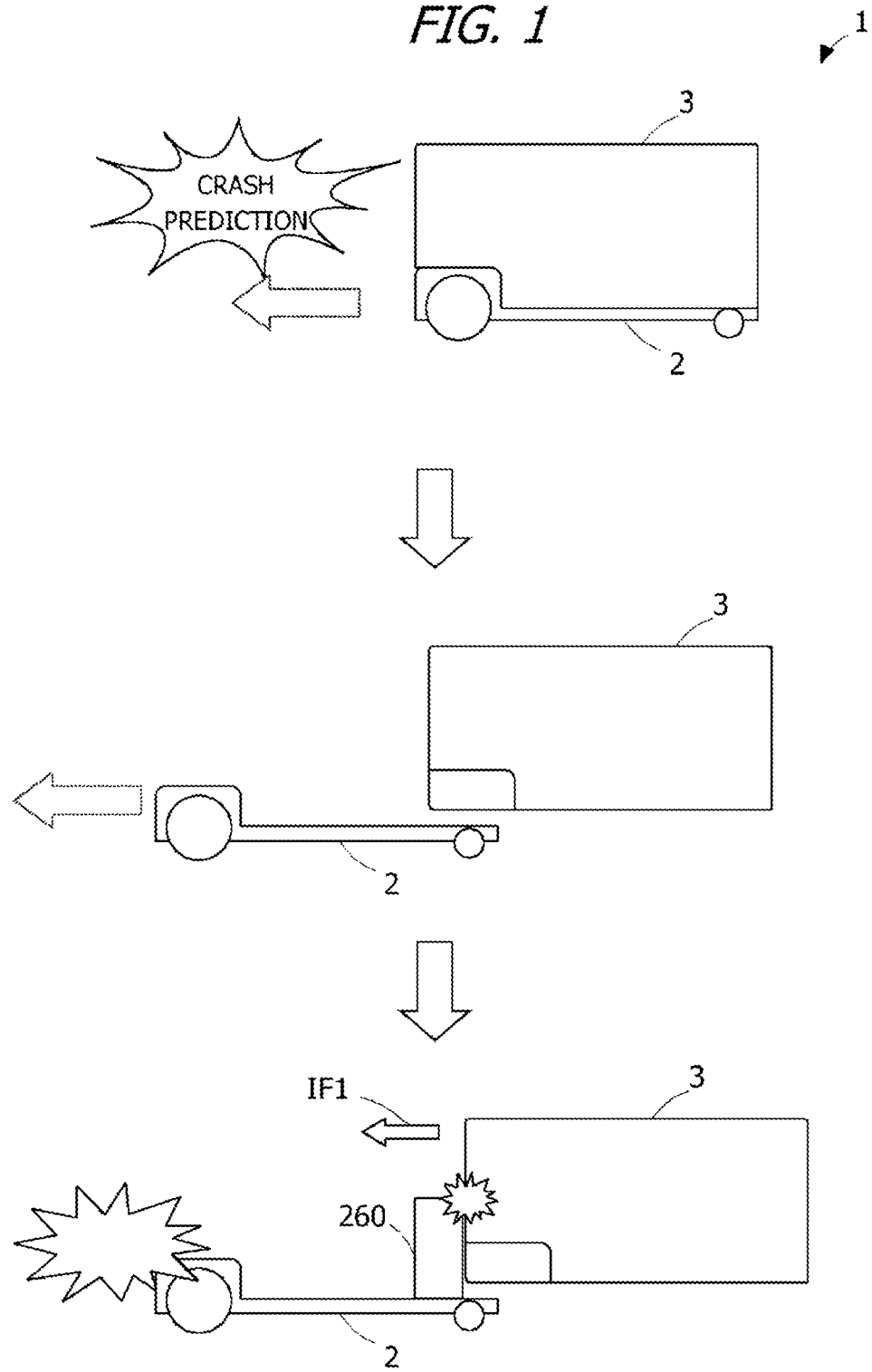
FIG. 1 is a diagram illustrating an example of a configuration of a vehicle 1 according to a first embodiment.

One of aspects of the present disclosure is a vehicle system including a body unit, a traveling unit capable of traveling with the body unit being mounted, and coupling units that couple the body unit and the traveling unit. A vehicle formed by a traveling unit and a body unit is also referred to as a so-called separable type vehicle. By being coupled by the coupling units so that the body unit is fixed to the traveling unit, the separable type vehicle can stably travel. In the case of a crash accident, if the separable type vehicle can cause the traveling unit and the body unit to be separated before the crash or cause the body unit to move to avoid the crash, an impact on an occupant in the body unit by the crash can be reduced.

Therefore, a vehicle system in the one of the aspects of the present disclosure includes a sensor configured to predict a crash, and a controller that executes causing the coupling between the traveling unit and the body unit by the coupling units to be released if a crash is predicted based on a detection value of the sensor. However, even if the coupling between the traveling unit and the body unit is released, a possibility that the body unit is involved in the crash is high because the body unit is mounted on the traveling unit, and the body unit remains being mounted on the traveling unit by an inertial force or a friction force. Therefore, the vehicle system in the one of the aspects of the present disclosure includes an acting unit that, when the coupling between the traveling unit and the body unit by the coupling units is released, acts so that a positional relationship between the body unit and the traveling unit is changed, and an acted-upon unit that receives the action of the acting unit. The change in the positional relationship between the body unit and the traveling unit is, for example, causing the body unit and the traveling unit to be separated in a predetermined direction, causing, for left and right relative to a traveling direction, the body unit to move to a side opposite to a side where the crash is predicted, or the like.

In the one of the aspects of the present disclosure, by the positional relationship between the traveling unit and the body unit being changed when a crash is predicted, an impact of the crash on the body unit can be reduced. Note that the coupling units, the sensor and the control unit may be provided on any of the body unit and the traveling unit. As for the acting unit and the acted-upon unit, it does not matter which of them is provided on the body unit or the traveling unit if one and the other are provided on the body unit and the traveling unit, respectively. As the sensor configured to predict a crash, for example, a radar using millimeter waves, microwaves or ultrasonic waves, a LIDAR (Light Detection And Ranging) sensor, a camera and the like are included, and one or more of them may be adopted. Note that the sensor configured to predict a crash is not limited thereto.

In the one of the aspects of the present disclosure, the acting unit may, when the coupling between the traveling unit and the body unit by the coupling units is released, act on the acted-upon unit so that the body unit is separated in a predetermined direction relative to the traveling unit. The predetermined direction in which the body unit is separated from the traveling unit is, for example, an opposite direction of the traveling direction of the traveling unit, any of left or right directions relative to the traveling direction, a vertically upward direction relative to the traveling direction or the like. However, the predetermined direction in which the body unit is separated from the traveling unit is not limited to a particular direction. Since the body unit is separated in the predetermined direction relative to the traveling unit, there is a possibility that an impact on the body unit by a crash can be reduced, or the crash itself can be avoided.

In this case, the acting unit may be provided on one of a top face of the traveling unit and a bottom face of the body unit; the acted-upon unit may be provided on the other between the top face of the traveling unit and the bottom face of the body unit; and the acting unit and the acted-upon unit may be formed by such material that a friction coefficient on a contact surface where the acting unit and the acted-upon unit are in contact with each other is below a predetermined value. In this case, when the coupling between the traveling unit and the body unit is released, it becomes impossible to maintain the state in which the body unit is mounted on the traveling unit because a friction force that occurs on the contact surface between the traveling unit and the body unit decreases, and the body unit may be separated from the traveling unit in the opposite direction of the traveling direction of the traveling unit relative to the traveling unit. Thereby, the body unit is behind the traveling unit, and, therefore, an impact of a crash on the body unit can be reduced.

Or alternatively, in the above case, the acting unit may be provided on the top face of the traveling unit and may be in a shape inclined to be gradually lower in the predetermined direction in which the body unit is separated from the traveling unit. The acted-upon unit is provided on the bottom face of the body unit and may be in a shape inclined according to the inclined shape of the acting unit. In this case, when the coupling between the traveling unit and the body unit by the coupling units is released, the body unit easily slides down on the inclination in the predetermined direction due to the gravity, and the possibility of the body unit being separated from the traveling unit increases. Note that, when the predetermined direction in which the body unit is separated from the traveling unit is the opposite direction of the traveling direction of the traveling unit, the body unit more easily slides down on the inclination in the predetermined direction. Thereby, there is a possibility that an impact on the body unit by a crash can be reduced, or the crash itself can be avoided.

Or alternatively, in the above case, the acting unit may be provided on one of the top face of the traveling unit and the bottom face of the body unit, and the acted-upon unit may be provided on the other between the top face of the traveling unit and the bottom face of the body unit. The acting unit and the acted-upon unit may form a linear motor deployed in the predetermined direction in which the body unit is separated from the traveling unit. The controller may cause the linear motor to work so as to cause the body unit to move in the predetermined direction after the coupling between the traveling unit and the body unit is released. Thereby, the body unit is thrown out from the traveling unit in the predetermined direction, and there is a possibility that an impact on the body unit by a crash can be reduced, or a crash itself can be avoided.

Or alternatively, in the above case, the acting unit may be one or more gas injecting units that inject predetermined gas in such a direction that the body unit is separated in the predetermined direction relative to the traveling unit. In this case, the controller may cause the predetermined gas to be injected from the gas injecting units after the coupling between the traveling unit and the body unit is released. When the gas is injected from the gas injecting units, the body unit is caused to move by force of the injection in a gas injection direction if the gas injecting units are provided on the traveling unit, and in a direction opposite to the gas injection direction if the gas injecting units are provided on the body unit, and the traveling unit and the body unit are separated. Thereby, there is a possibility that an impact on the body unit by a crash can be reduced, or a crash itself can be avoided.

Or alternatively, in the above case, the acting unit may be provided with a pushing unit that pushes out the body unit in such a direction that the body unit is separated in the predetermined direction relative to the traveling unit by a command. In this case, a command to activate the pushing unit may be outputted to the acting unit after the coupling between the traveling unit and the body unit is released. When the pushing unit works, the body unit is pushed out in a direction in which the pushing unit protrudes out if the pushing unit is provided on the traveling unit, and in a direction opposite to the direction in which the pushing unit protrudes if the pushing unit is provided on the body unit, and the traveling unit and the body unit are separated. Thereby, there is a possibility that an impact on the body unit by a crash can be reduced, or a crash itself can be avoided.

Further, in the one of the aspects of the present disclosure, the traveling unit may be further provided with a stopper for suppressing the body unit from traveling in the traveling direction more than the traveling unit by an inertial force applied in the traveling direction after being separated from the body unit, by protruding upward from the top face of the traveling unit. The stopper may be formed with soft material capable of absorbing an impact. Since the body unit is suppressed from traveling in the traveling direction more than the traveling unit by the stopper, an impact on the body unit by a predicted crash can be reduced.

The stopper may have an inclined face that is gradually higher from a front end part on the traveling direction side toward a rear end part on a side opposite to the traveling direction side, and a vertical face substantially orthogonal to the top face, the vertical face connecting to the rear end part of the inclined face. In this case, the bottom face of the body unit may be in a shape with which the stopper is fitted. In the state in which the body unit is mounted on the traveling unit, the body unit moves in the direction opposite to the traveling direction more easily than in the traveling direction. Since the stopper is in such a shape, and the bottom face of the body unit is in the shape of being fitted with the stopper, the body unit is caught by the stopper when it travels in the traveling direction by an inertial force after being separated from the traveling unit, and movement in the traveling direction is obstructed. Thereby, impact of a crash on the body unit can be reduced. Further, the stopper is energy-saving because it does not use other powers. The other powers include, for example, electric power and the like.

Or alternatively, the stopper may be accommodated in the traveling unit. In this case, the traveling unit may be further provided with a power giving unit that gives power for causing the stopper to protrude, to the stopper. The controller may control the power giving unit to execute causing the stopper to protrude from the traveling unit when a distance of the body unit relative to the traveling unit is equal to or above a predetermined value. As power for causing the stopper to protrude, there are, for example, pressure, an elastic force and the like. As the power giving unit, there are, for example, an oil hydraulic circuit, a spring and the like. According to the above, the controller can control protrusion and accommodation of the stopper. Further, special equipment and change in the shape for the body unit do not occur by the traveling unit being provided with the stopper.

Or alternatively, the traveling unit may be further provided with an elastic body that biases the stopper. In this case, the stopper may be suppressed from protruding from the top face by weight of the body unit mounted on the traveling unit being applied to the elastic body. The stopper may be adapted to protrude from the traveling unit by an elastic force given by the elastic body, by the distance of the body unit relative to the traveling unit becomes equal to or above a predetermined value. The stopper is energy-saving because it does not use other powers. Further, change in the body unit caused by providing the stopper does not occur.

In the one of the aspects of the present disclosure, the acting unit may act so as to cause the body unit mounted on the traveling unit to move to left or right relative to the traveling direction. In this case, the controller may estimate which of the left and the right relative to the traveling direction a predicted crash occurs, based on a detection value of the sensor and control the acting unit so that the body unit moves in a direction opposite to the estimated direction. Thereby, the body unit moves in the direction opposite to the direction in which the crash is predicted, between the left and right of the traveling direction, and, thereby, a possibility that the crash can be avoided becomes high.

Further, in this case, the acting unit may be provided on one of the top face of the traveling unit and the bottom face of the body unit. The acted-upon unit may be provided on the other between the top face of the traveling unit and the bottom face of the body unit. The acting unit and the acted-upon unit may form a linear motor deployed in the left and right directions relative to the traveling direction together. The controller may control the linear motor so that the body unit moves in the direction opposite to the estimated direction.

Or alternatively, the acting unit may be a gear with a predetermined radius, which is provided on one of the top face of the traveling unit and the bottom face of the body unit. In this case, the acted-upon unit may be a rack with an infinite radius, which is provided on the other between the top face of the traveling unit and the bottom face of the body unit. The acting unit and the acted-upon unit may be deployed in the left and right directions relative to the traveling direction. The controller may control the gear so that the body unit moves in the direction opposite to the estimated direction.

Further, one of other aspects of the present disclosure may be a traveling unit provided with the coupling unit, sensor, controller and acting unit described above. The controller and acting unit of the traveling unit may be similar to the controller and acting unit described above, respectively.

In the following, an embodiment of the present disclosure will be described with reference to the drawings. The configuration of the embodiment described below is an example, and the present disclosure is not limited to the configuration of the embodiment.

First Embodiment

FIG. 1 is a diagram illustrating an example of a configuration of a vehicle 1 according to a first embodiment. The vehicle 1 is such a vehicle that a body unit 3 is mounted on a traveling unit 2 and coupled. The traveling unit 2 is, for example, an electric car capable of autonomous traveling, which is provided with a plurality of wheels. However, without being limited thereto, the traveling unit 2 may be an engine-driven car or may be a car that travels by being driven by a person. The body unit 3 is not provided with a function of traveling alone. The body unit 3 is, for example, a case capable of accommodating persons, baggage and the like. Shapes and specifications of the traveling unit 2 and the body unit 3 are not limited to particular ones, and anything may be applied.

Such a vehicle that the traveling unit 2 and the body unit 3 are separated like the vehicle 1 is referred to as a separate type vehicle. Further, such a separate type vehicle that the body unit 3 is mounted on the traveling unit 2 like the vehicle 1 is referred to as a vertically separated type vehicle. Note that the traveling unit 2 and the body unit 3 can be variously combined.

In the first embodiment, the traveling unit 2 performs prediction of a crash based on a detection value of a sensor and performs crash avoidance control which is control for avoiding a crash. Specifically, when a crash is predicted, the traveling unit 2 separates the body unit 3 as the crash avoidance control (see a center of FIG. 1). Note that the separation stated here refers to releasing coupling between the traveling unit 2 and the body unit 3 by coupling units provided on the traveling unit 2 and the body unit 3, respectively, and, furthermore, the traveling unit 2 and the body unit 3 being separated. In the first embodiment, it is assumed that the body unit 3 is mounted on the traveling unit 2. Therefore, even if the coupling by the coupling units is released, a possibility that the state in which the body unit 3 is mounted on the traveling unit 2 is maintained is high. Therefore, in the first embodiment, "separation" does not include a state in which coupling by the coupling units is merely released. In the first embodiment, "separation" refers to a state in which the traveling unit 2 and the body unit 3 are completely separated and are not in contact with each other.

By the body unit 3 being separated from the traveling unit 2 when a crash is predicted, it is possible to cause the body unit 3 to avoid the crash even if the traveling unit 2 is not able to avoid the crash.

However, in the state in which the body unit 3 is separated from the traveling unit 2, an inertial force IF1 acts on the body unit 3 in the traveling direction. Therefore, there is a possibility that the body unit 3 travels in the traveling direction even after being separated from the traveling unit 2. If the body unit 3 travels in the traveling direction by the inertial force after being separated from the traveling unit 2, there is a possibility that the body unit 3 is involved in the crash predicted by the traveling unit 2. For example, a distance from a place where a crash is predicted to a place where the crash actually occurs is often not so long. In such a case, a possibility that the traveling unit 2 causes the predicted crash soon after the body unit 3 is separated is high. When the body unit 3 travels in the traveling direction by the inertial force then, the body unit 3 is also involved in the crash of the traveling unit 2.

Therefore, in the first embodiment, the traveling unit 2 is provided with a stopper 260 and causes the stopper 260 to protrude upward after the body unit 3 is separated. Thereby, for example, when the body unit 3 travels in the traveling direction by the inertial force acting in the traveling direction even after the body unit 3 is separated, the body unit 3 is suppressed from traveling more than the traveling unit 2 to avoid the body unit 3 from being involved in the predicted crash. Further, for example, even when the body unit 3 is involved in the predicted crash, an impact of the crash can be reduced because speed is reduced by the stopper 260 before the crash.

Figure 2:
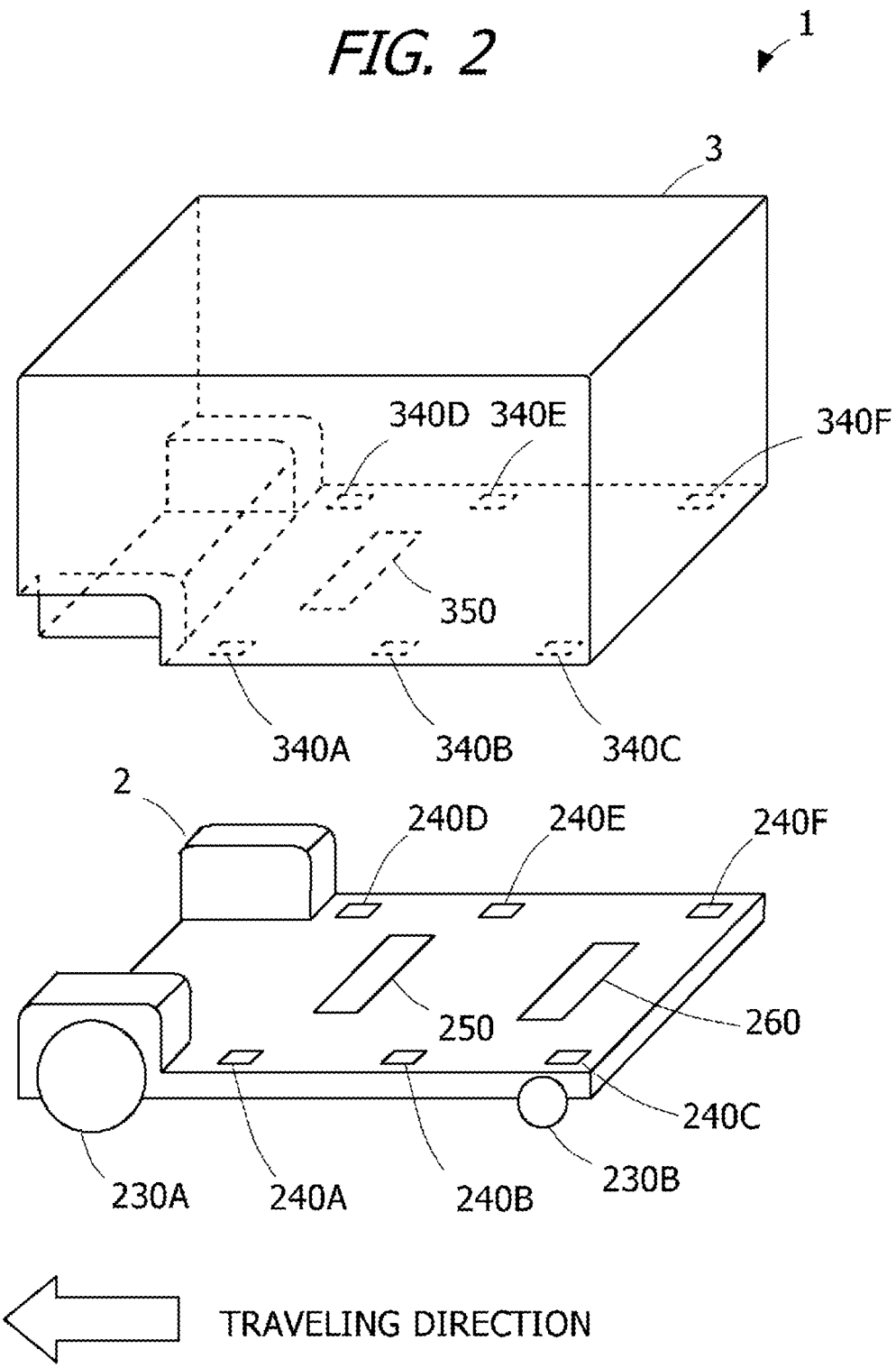
FIG. 2 is a diagram illustrating an example of an external appearance of the vertically separated vehicle.

FIG. 2 is a diagram illustrating an example of an external appearance of the vertically separated vehicle 1. The traveling unit 2 is provided with wheels 230, and coupling units 240A to 240F, a separation-acting unit 250 and the stopper 260 on a top face. The body unit 3 is provided with coupling units 340A to 340F and a separation-acted-upon unit 350 on a bottom face. A direction of an arrow in FIG. 2 is the traveling direction of the vehicle 1. The traveling direction of the vehicle 1 can be paraphrased, for example, as a forward direction of the vehicle 1. The separation-acting unit 250 is an example of "the acting unit". The separation-acted-upon unit 350 is an example of "the acted-upon unit".

The coupling units 240A to 240F of the traveling unit 2 and the coupling units 340A to 340F of the body unit 3 are provided such that the coupling units 240A to 240F are located, mutually facing when the body unit 3 is mounted on the traveling unit 2. When the coupling units 240A to 240F of the traveling unit 2 and the coupling units 340A to 340F of the body unit 3 are referred to as the coupling units 240 and the coupling units 340, respectively, when the coupling units 240A to 240F are not mutually distinguished, and the coupling units 340A to 340F are not mutually distinguished, either.

For example, either the coupling units 240 or the coupling units 340 are of a protruding type, and the other coupling units are of a recessed type, so that paired fitting/fitted units are formed. As for the protruding type coupling units between the coupling units 240 and the coupling units 340, protruding parts are protruded or accommodated. For example, the protruding type coupling units are accommodated in the traveling unit 2 or the body unit 3 when the traveling unit 2 and the body unit 3 are not coupled, and protrude when the traveling unit 2 and the body unit 3 are coupled. By the protruding type coupling units between the coupling units 240 and the coupling units 340 protruding and being fitted with the remaining coupling units, the body unit 3 is fixed to the traveling unit 2. When the coupling between the traveling unit 2 and the body unit 3 is released, the protruding type coupling units between the coupling units 240 and the coupling units 340 are accommodated in the traveling unit 2 or the body unit 3 again. In the first embodiment, description will be made on an assumption that the coupling units 240 of the traveling unit 2 are of the protruding type, and the coupling units 340 of the body unit 3 are of the recessed type. In the first embodiment, by the traveling unit 2 controlling protrusion and accommodation of the coupling units 240, coupling between the traveling unit 2 and the body unit 3 is released.

Note that the coupling units 240 and the coupling units 340 are not limited to the above. For example, the coupling units 240 and the coupling units 340 may be electromagnets. The coupling units 240 and the coupling units 340 are not energized when the traveling unit 2 and the body unit 3 are not coupled, and are energized when the traveling unit 2 and the body unit 3 are coupled. By the coupling units 240 and the coupling units 340 being energized, the coupling units 240 and the coupling units 340 become magnets and are coupled, and the body unit 3 is fixed to the traveling unit 2.

The separation-acting unit 250 of the traveling unit 2 acts on the body unit 3 so that the body unit 3 is separated from the traveling unit 2. There are a plurality of methods for causing the body unit 3 to be separated from the traveling unit 2, which will be described later. The separation-acted-upon unit 350 of the body unit 3 is a component that receives action from the separation-acting unit 250 of the traveling unit 2 and is provided at a position where the action by the separation-acting unit 250 of the traveling unit 2 is received. Shapes and arrangement positions of the separation-acting unit 250 and the separation-acted-upon unit 350 change according to a method for causing the body unit 3 to be separated from the traveling unit 2.

The stopper 260 is for stopping the body unit 3 from traveling in the traveling direction when the body unit 3 is separated from the traveling unit 2 while traveling. A shape, an arrangement position and the like of the stopper 260 are not limited to those illustrated in FIG. 2 and are a shape and an arrangement position according to a method for stopping the body unit 3. The method for stopping the body unit 3 that travels in the traveling direction by an inertial force and variations of the stopper 260 will be described later.

Further, as a method for causing the body unit 3 to be mounted on the traveling unit 2 or unloading the body unit 3 from the traveling unit 2 for the vertically separated type vehicle 1, there are, for example, a method using a dedicated lift, a method using a mechanism for mounting or unloading, which is provided on the body unit 3 or traveling unit 2 itself, and the like. One of specific examples is a method in which a mechanism that causes the body unit 3 to be lifted or lowered like a jack is provided at a lower part of a side face of the body unit 3. In this case, the traveling unit 2 moves under the body unit 3 while the body unit 3 is lifted by the jack, and the body unit 3 is mounted onto the traveling unit 2 by the body unit 3 being lowered. Note that the method for causing the body unit 3 to be mounted on the traveling unit 2 or unloading the body unit 3 from the traveling unit 2 for the vertically separated type vehicle 1 is not limited to a particular method.

<Method for Causing Body Unit to be Separated from Traveling Unit>

Figure 5:
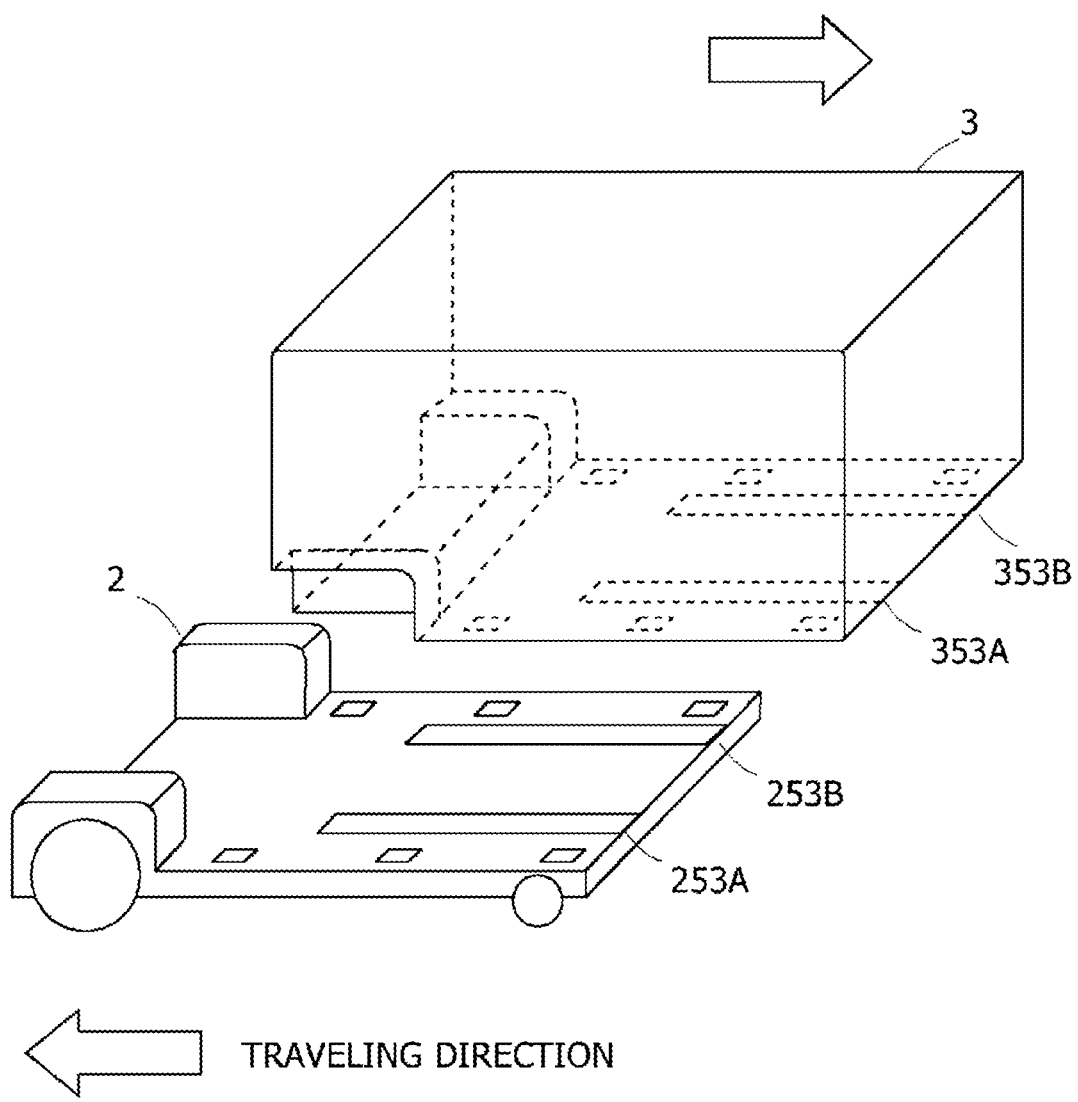
FIG. 5 is a diagram illustrating an example of the method for causing the body unit to be separated from the traveling unit.
Figure 6:
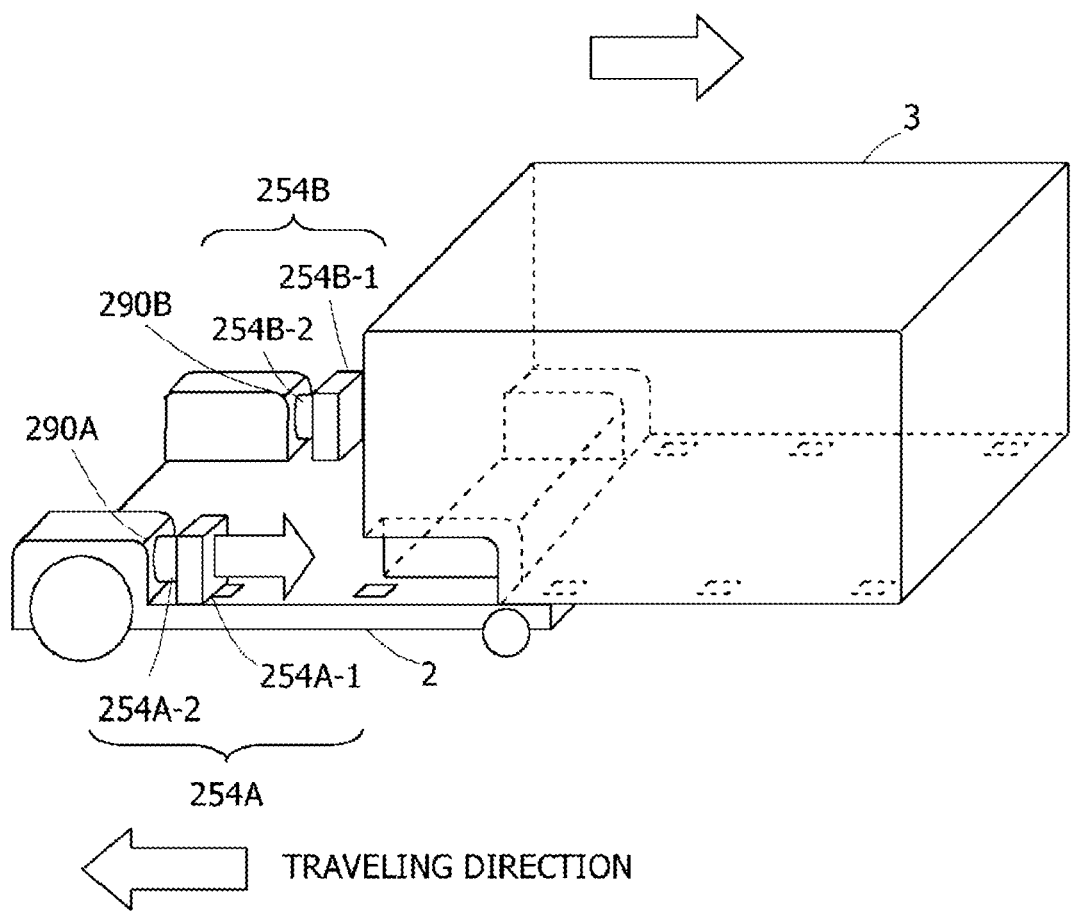
FIG. 6 is a diagram illustrating an example of the method for causing the body unit to be separated from the traveling unit.
Figure 7:
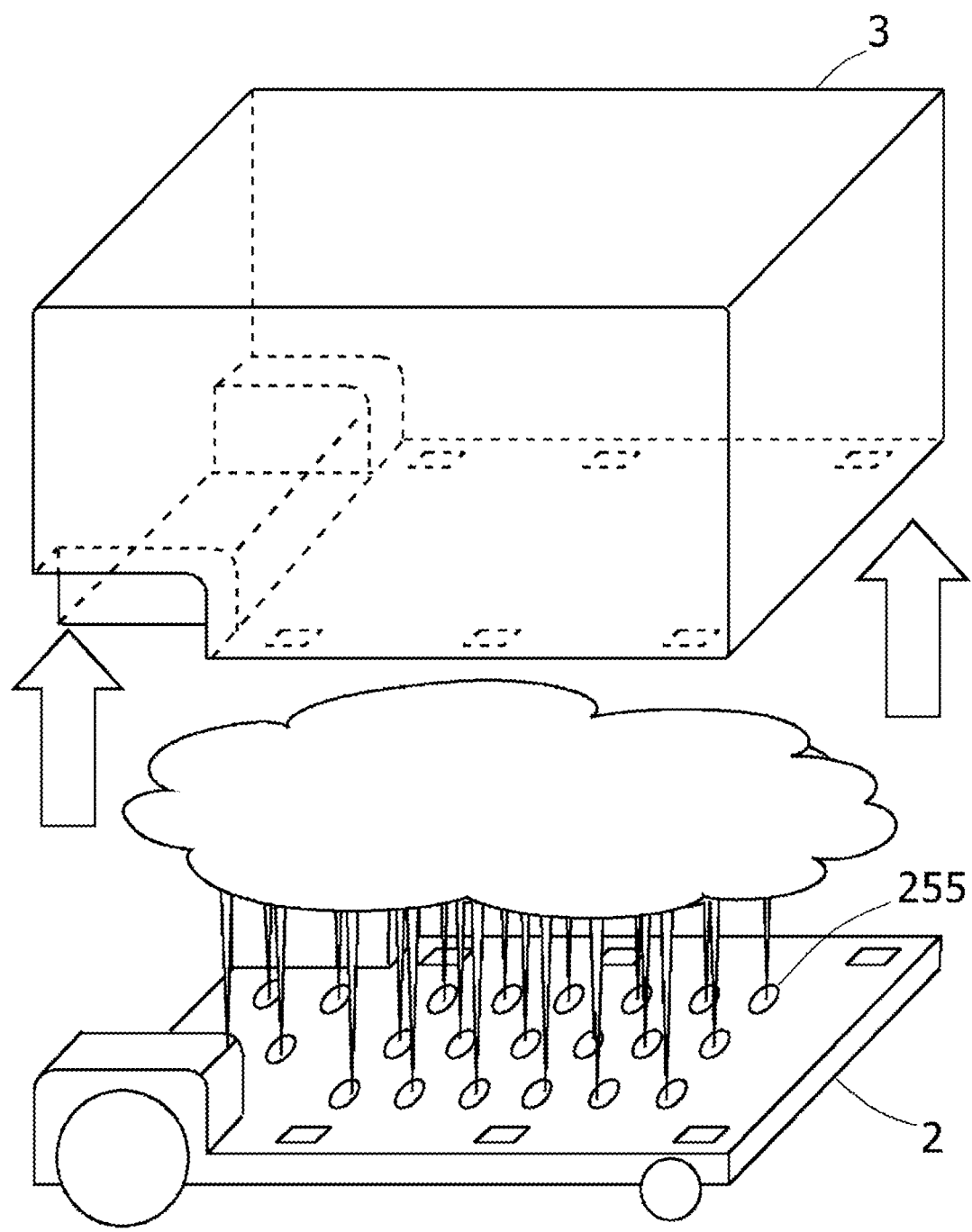
FIG. 7 is a diagram illustrating an example of the method for causing the body unit to be separated from the traveling unit.
Figure 8:
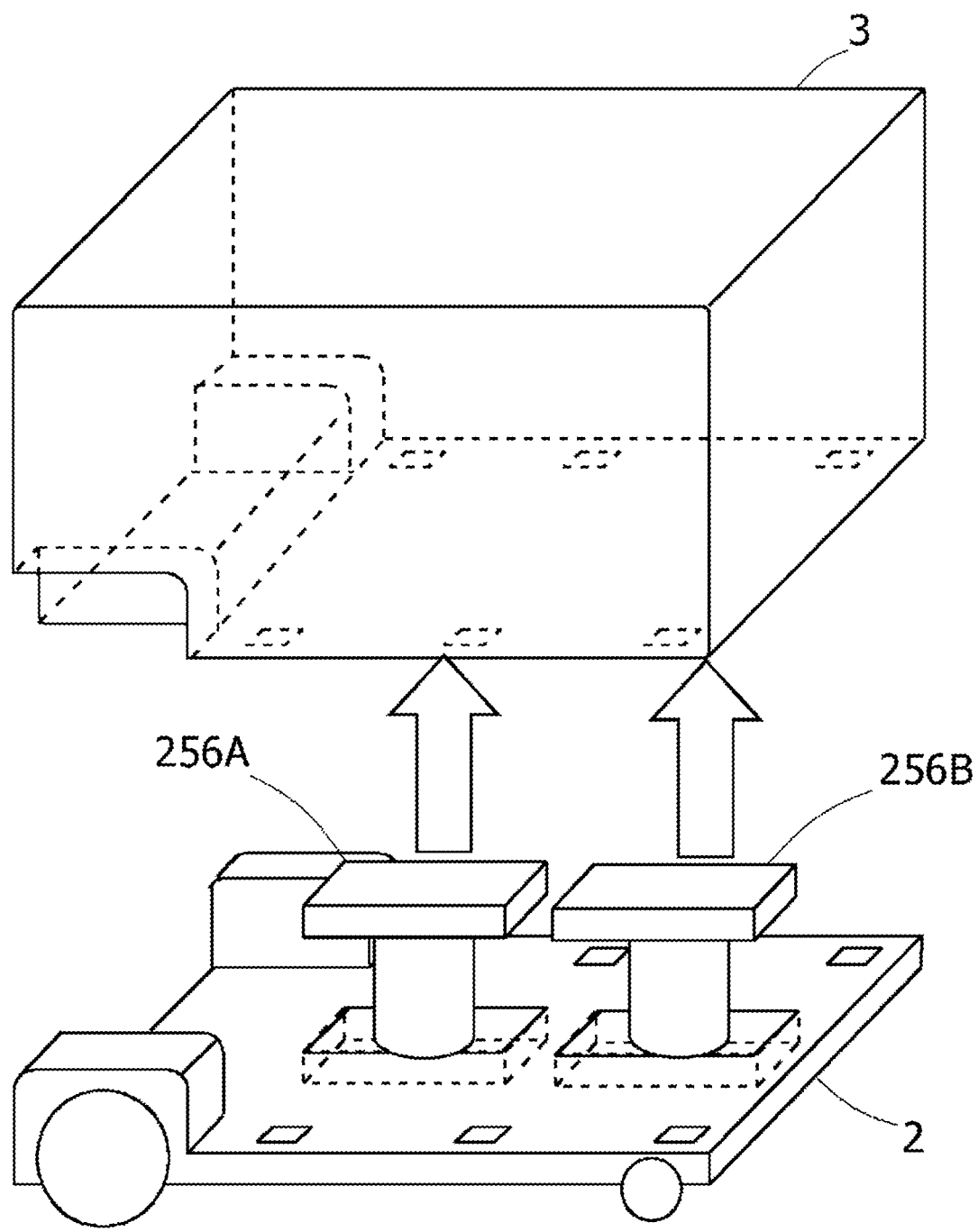
FIG. 8 is a diagram illustrating an example of the method for causing the body unit to be separated from the traveling unit.

Each of FIGS. 3, 4, 5, 6, 7 and 8 is a diagram illustrating an example of the method for causing the body unit 3 to be separated from the traveling unit 2. FIGS. 3 to 6 illustrate examples of causing the body unit 3 to be separated from the traveling unit 2 in the direction opposite to the traveling direction. FIGS. 7 to 8 illustrate examples of causing the body unit 3 to be separated from the traveling unit 2 vertically upward.

Figure 3:
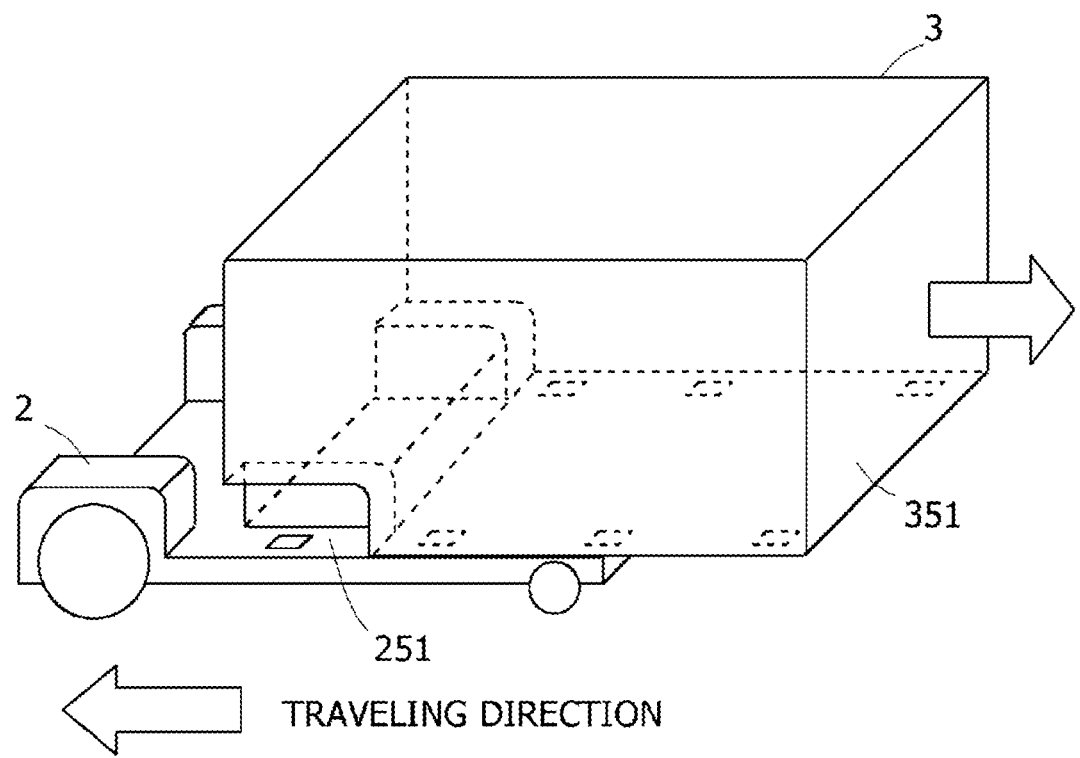
FIG. 3 is a diagram illustrating an example of the method for causing the body unit to be separated from the traveling unit.

FIG. 3 illustrates a method for causing the body unit 3 to be separated from the traveling unit 2 by reducing a friction coefficient on a contact surface between the traveling unit 2 and the body unit 3 so that the body unit 3 slides out from the traveling unit 2. In this case, a top face 251 of the traveling unit 2 corresponds to the separation-acting unit 250, and a bottom face 351 of the body unit 3 corresponds to the separation-acted-upon unit 350. In the example illustrated in FIG. 3, a friction force that occurs between the traveling unit 2 and the body unit 3 decreases when coupling by the coupling units 240 and the coupling units 340 is released, and the body unit 3 slides out from the traveling unit 2. Thereby, for example, even during acceleration of the vehicle 1, during steady traveling of the vehicle 1, or during deceleration, by force in the direction opposite to the traveling direction being applied to the body unit 3, such as receiving of air resistance, the body unit 3 is separated in the direction opposite to the traveling direction relative to the traveling unit 2.

Figure 4:
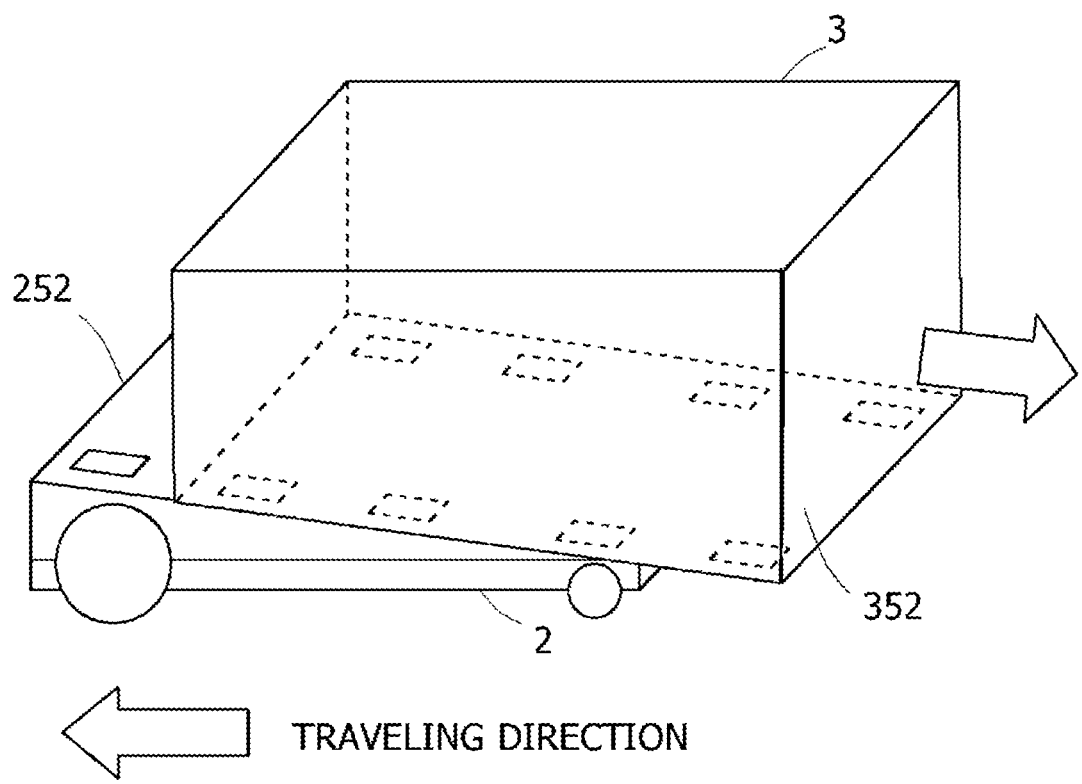
FIG. 4 is a diagram illustrating an example of the method for causing the body unit to be separated from the traveling unit.

FIG. 4 illustrates a method for causing the body unit 3 to be separated from the traveling unit 2 by inclining a top face of the traveling unit 2 and utilizing the body unit 3 sliding down on the inclination. A top face 252 of the traveling unit 2 is inclined to be gradually lower from the front to rear of the traveling unit 2. The front of the traveling unit 2 is the traveling direction side, and the rear is a side opposite to the traveling direction side. A bottom face 352 of the body unit 3 is in a shape corresponding to the inclination of the top face 252 of the traveling unit 2. In this case, the inclined top face 252 of the traveling unit 2 corresponds to the separation-acting unit 250, and the bottom face 352 of the body unit 3 corresponds to the separation-acted-upon unit 350.

In the example illustrated in FIG. 4, the body unit 3 slides down in the direction opposite to the traveling direction relative to the traveling unit 2 by the gravity when coupling by the coupling units 240 and the coupling units 340 is released. On the other hand, the traveling unit 2 continues traveling in the traveling direction. Thereby, the body unit 3 is separated in the direction opposite to the traveling direction relative to the traveling unit 2.

FIG. 5 illustrates a method for causing the body unit 3 to be separated from the traveling unit 2 by configuring linear motors on the contact surface between the traveling unit 2 and causing the body unit 3 to move on the traveling unit 2 by the linear motors. In the example illustrated in FIG. 5, the traveling unit 2 is provided with coils 253A and 253B on the top face. The body unit 3 is provided with electromagnets 353A and 353B on the bottom face. The coils 253A and 253B of the traveling unit 2 and the electromagnets 353A and 353B of the body unit 3 are provided so as to mutually face, respectively, when the body unit 3 is mounted on the traveling unit 2. The coils 253A and 253B of the traveling unit 2 form the linear motors together with the electromagnets 353A and 353B of the body unit 3, respectively.

For example, on the electromagnets 353A and 353B of the body unit 3, S poles and N poles are alternately arranged. When a current is applied to the coils 253A and 253B of the traveling unit 2, magnetic fields (S poles and N poles) occur, and the body unit 3 moves in a direction in which the coils 253A and 253B are deployed by attracting force between S poles and N poles and repelling force between S poles and between N poles, between the electromagnets 353A and 353B of the body unit 3. By the coils 253A and 253B being deployed in the traveling direction on the top face of the traveling unit 2, and controlling the current flowing through the coils 253A and 253B so that the body unit 3 travels in the direction opposite to the traveling direction, it is possible to cause the body unit 3 to move in the direction opposite to the traveling direction relative to the traveling unit 2. By the force causing the body unit 3 to move in the direction opposite to the traveling direction being applied to the body unit 3 by the linear motors, the body unit 3 is separated from the traveling unit 2 in the direction opposite to the traveling direction.

In the example illustrated in FIG. 5, the coils 253A and 253B of the traveling unit 2 correspond to the separation-acting unit 250. The electromagnets 353A and 353B of the body unit 3 correspond to the separation-acted-upon unit 350. Note that the number of coils and electromagnets provided on the traveling unit 2 and the body unit 3 is not limited to the numbers illustrated in FIG. 5.

FIG. 6 illustrates a method for causing the body unit 3 to be separated from the traveling unit 2 by providing the traveling unit 2 with a mechanism that pushes out the body unit 3. In the example illustrated in FIG. 6, the traveling unit 2 is provided with pushing units 254A and 254B on side faces 290A and 290B, respectively.

The pushing units 254A and 254B include pushing faces 254A-1 and 254B-1, and arms 254A-2 and 254B-2, respectively. The arms 254A-2 and 254B-2 extend and contract, and are usually in a contracted state. For example, the arms 254A-2 and 254B-2 extend in the direction opposite to the traveling direction to separate the body unit 3. Thereby, the pushing faces 254A-1 and 254B-1 push out the body unit 3 in the direction opposite to the traveling direction, and the body unit 3 is separated from the traveling unit 2.

Extension and contraction of the arms 254A-2 and 254B-2 are controlled, for example, by an oil hydraulic circuit or the like. However, the control of extension and contraction of the arms 254A-2 and 254B-2 is not limited thereto. For example, such that utilizes an elastic force of an elastic body is also possible. As the elastic body, there is, for example, a spring. Note that the pushing units 254A and 254B illustrated in FIG. 6 are an example, and the number, shape, installation positions and the like of the pushing units 254 can be changed according to the shapes and the like of the traveling unit 2 and the body unit 3. In the example illustrated in FIG. 6, the pushing units 254A and 254B correspond to the separation-acting unit 250. Parts of the body unit 3 where the pushing units 254A and 254B face in the state in which the body unit 3 is mounted on the traveling unit 2 correspond to the separation-acted-upon unit 350.

FIG. 7 illustrates an example of a method for causing the body unit 3 to be separated from the traveling unit 2 by causing gas to be injected upward from the traveling unit 2 to float the body unit 3 upward. The traveling unit 2 has a plurality of gas injection ports 255 on the top face and injects gas upward from the gas injection ports 255 to separate the body unit 3. The injected gas is not limited to particular gas. For example, the gas injected from the gas injection ports 255 may be air. When the gas is injected from the gas injection ports 255, force occurs toward an upward direction, and the body unit 3 is floated from the traveling unit 2 and separated. For example, if the vehicle 1 is accelerating, the traveling unit 2 continues traveling in the traveling direction while the body unit 3 is floated. Therefore, even if the body unit 3 falls from the float, a possibility of the body unit 3 being mounted on the traveling unit 2 again is low. For example, even if the vehicle 1 is steadily traveling or decelerating, speed of the body unit 3 is lower relative to speed of the traveling unit 2 by the body unit 3 receiving air resistance, and, therefore, the possibility of the body unit 3 being mounted on the traveling unit 2 again is low even if the body unit 3 falls from the float.

In the example illustrated in FIG. 7, the plurality of gas injection ports 255 correspond to the separation-acting unit 250. The bottom face of the body unit 3 that receives the gas injected from the gas injection ports 255 corresponds to the separation-acted-upon unit 350. Note that the installation positions, shape and the like of the gas injection ports 255 are not limited to those illustrated in FIG. 7.

FIG. 8 illustrates an example of a method for causing the body unit 3 to be separated from the traveling unit 2 by pushing up the body unit 3. In the example illustrated in FIG. 8, the traveling unit 2 is provided with pushing units 256A and 256B that push out the body unit 3 upward. A structure of the pushing units 256A and 256B is similar to the structure of the pushing units 254A and 254B of the example illustrated in FIG. 6.

By the pushing units 256A and 256B protruding upward, the body unit 3 is pushed up, floated from the traveling unit 2 and separated. Note that the pushing units 256A and 256B illustrated in FIG. 8 are an example, and the number, shape, installation positions and the like of the pushing units 256 can be changed according to the shapes and the like of the traveling unit 2 and the body unit 3. In the example illustrated in FIG. 8, the pushing units 256A and 256B correspond to the separation-acting unit 250. Parts of the body unit 3 where the pushing units 256A and 256B face in the state in which the body unit 3 is mounted on the traveling unit 2 correspond to the separation-acted-upon unit 350.

<Configuration of Stopper>

Figure 11:
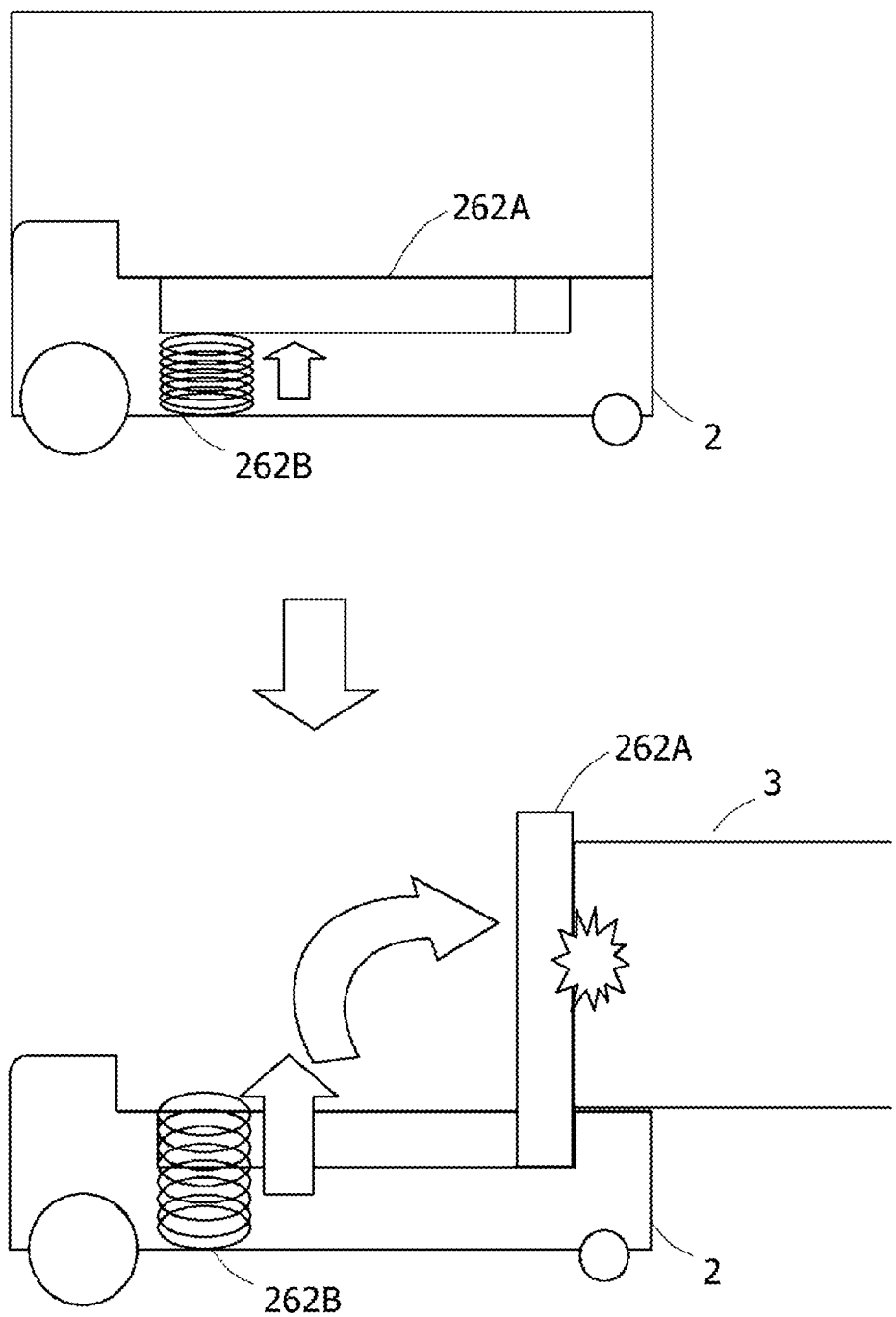
FIG. 11 is a diagram illustrating examples of a configuration of a stopper.

FIGS. 9, 11 and 12 are diagrams illustrating examples of a configuration of a stopper. FIG. 9 is a diagram illustrating an example of a stopper protruding above the traveling unit 2 in advance. In the example illustrated in FIG. 9, a stopper 261 is arranged on the top face of the traveling unit 2. The stopper 261 is formed so that a front end part is in contact with the top face of the traveling unit 2, and the stopper 261 has an inclined face 261A that is gradually higher from the front end part to a rear end part and a vertical face 261B which is a face substantially orthogonal to the top face and is connected to the rear end part of the inclined face 261A. According to this shape, a hollow 361 is formed in such a shape that the stopper 261 is fitted in.

Figure 10:
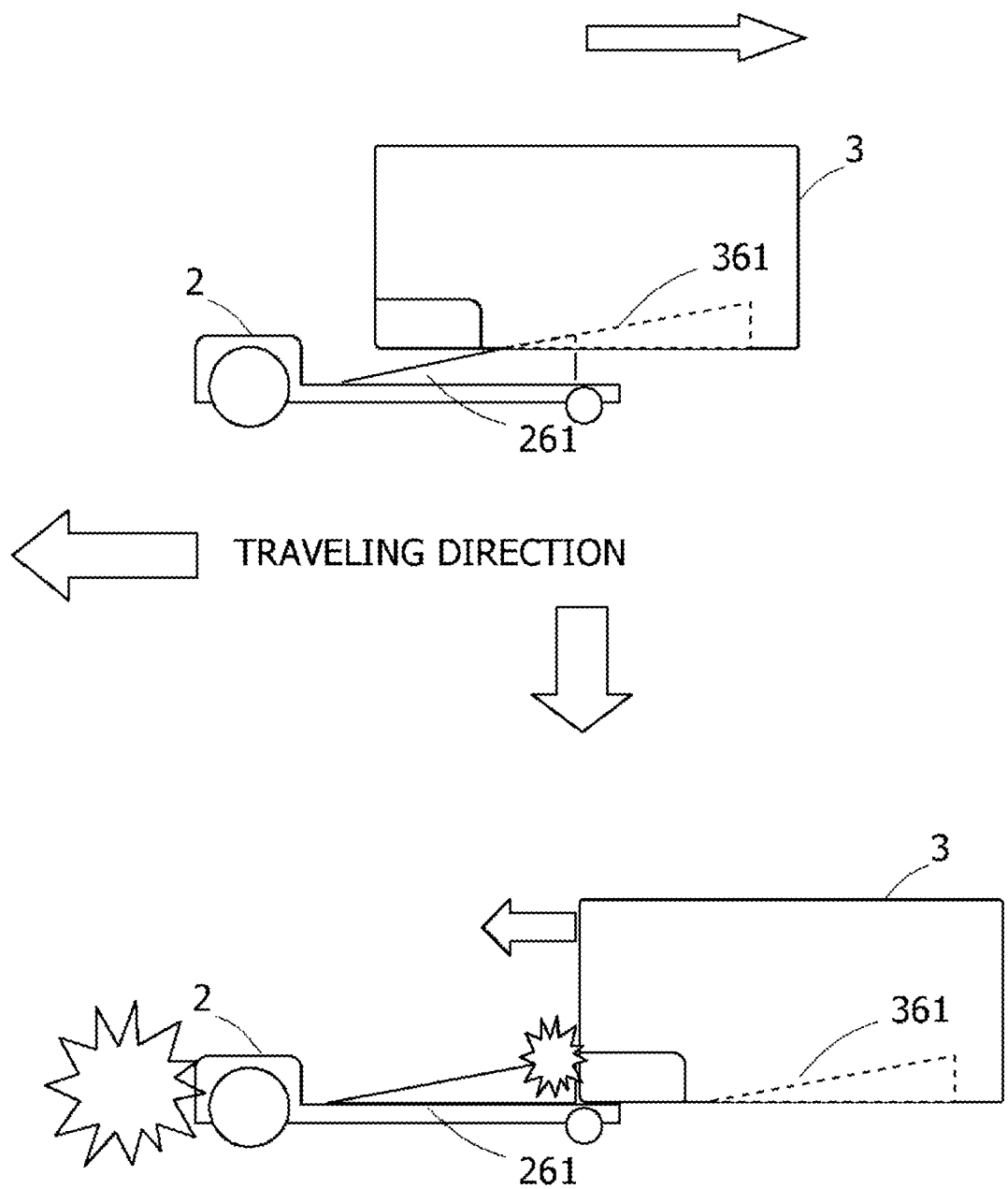
FIG. 10 is a diagram illustrating that traveling of the body unit in the traveling direction is stopped by the stopper of the example illustrated in FIG. 9 after being separated.

FIG. 10 is a diagram illustrating that traveling of the body unit 3 in the traveling direction is stopped by the stopper of the example illustrated in FIG. 9 after being separated. Since the stopper 261 is in such a shape that the front is low and the rear is high relative to the traveling unit 2, it is easy for the body unit 3 to move in the direction opposite to the traveling direction relative to the traveling unit 2 from the state of being mounted on the traveling unit 2 (see an upper part of FIG. 10). On the other hand, because of the shape of the stopper 261 having the vertical face 261B, it is not easy for the body unit 3 to move in the traveling direction relative to the traveling unit 2 from the state of being mounted on the traveling unit 2.

For example, when the traveling unit 2 causes a predicted crash after the body unit 3 is separated from the traveling unit 2 by action by the separation-acting unit 250, the body unit 3 may travel in the traveling direction by an inertial force and catch up with the traveling unit 2 that is stopping after the crash. At this time, the body unit 3 is caught by the vertical face 261B of the stopper 261 on the rear side relative to the traveling unit 2, and the function as a stopper is fulfilled (see a lower part of FIG. 10). There is a possibility that the traveling of the body unit 3 is stopped by being caught by the stopper 261. Further, even if the traveling does not stop, the speed is decreased by being caught by the stopper 261, and an impact of the crash can be reduced. Note that the shape of the stopper 261 is not limited to that illustrated in FIGS. 9 and 10.

FIG. 11 is a diagram illustrating an example of a stopper caused to protrude by an elastic force from below by an elastic body. The traveling unit 2 is provided with a stopper 262A and an elastic body 262B. The stopper 262A is, for example, a plate-shaped member having a predetermined thickness. The stopper 262A is installed such that it can be accommodated on a front surface side of the top face of the traveling unit 2. For example, an end of the stopper 262A on the rear side of the traveling unit 2 is coupled with the traveling unit 2 with a hinge or the like, and an end on the front side of the traveling unit 2 is not coupled with the traveling unit 2 and movable.

The elastic body 262B is provided below the stopper 262A of the traveling unit 2 on the front side of the traveling unit 2 to give an elastic force to the stopper 262A from below. The elastic body 262B is, for example, a spring. However, the elastic body 262B is not limited to a spring, and, may be made, for example, of shape memory metal, rubber or the like.

When the body unit 3 is mounted on the traveling unit 2, the stopper 262A is suppressed from protruding by weight of the body unit 3 and is in a state of being accommodated in the traveling unit 2. When the body unit 3 is separated from the traveling unit 2, and a distance between the traveling unit 2 and the body unit 3 becomes equal to or above a predetermined distance, the stopper 262A receives the elastic force from the elastic body 262B below, bounces with the end on the rear side of the traveling unit 2 as a base point, and is deployed.

Note that a supporter for maintaining the state of the stopper 262A having been bounced may be further provided. The supporter may be an electromagnet arranged on a contact surface between the stopper 262A and an accommodation part of the stopper 262A when the stopper 262A rises. The supporter is not limited thereto.

In the example illustrated in FIG. 11, since protrusion of the stopper 262A is due to a structure, a power source for causing the stopper 262A to protrude, control by software and the like are not needed. Note that the stopper 262A and the elastic body 262B are not limited to those illustrated in FIG. 11. For example, the end of the stopper 262A on the front side of the traveling unit 2 may be coupled with the traveling unit 2, and the end on the rear side may be movable. Note that, hereinafter, a stopper and a structure for causing the stopper to protrude will be referred to as a stopper mechanism together.

FIG. 12 is a diagram illustrating an example of a stopper caused to protrude from the traveling unit 2 by an oil hydraulic circuit. In the example illustrated in FIG. 12, the traveling unit 2 is provided with a stopper 263A and an oil hydraulic circuit 263B. When detecting that the body unit 3 is away from the traveling unit 2 by a predetermined distance or more after the body unit 3 is separated, the traveling unit 2 causes the stopper 263A to protrude by the oil hydraulic circuit 263B. The detection of the body unit 3 being away from the traveling unit 2 by the predetermined distance or more may be performed, for example, based on a detection value of a sensor such as a radar and a camera. Note that it is not limited to the oil hydraulic circuit 263B that gives power for causing the stopper 263A to protrude. For example, the stopper 263A may be caused to protrude by providing a gear in the traveling unit 2, providing the stopper 263A with a rack, and causing the gear to be rotated by a motor. Or alternatively, air pressure of a pump or the like may be used.

Note that any combination of a method for causing the body unit 3 to be separated from the traveling unit 2 and a stopper configuration method may be adopted.

<Configuration of Traveling Unit>

Figure 13:
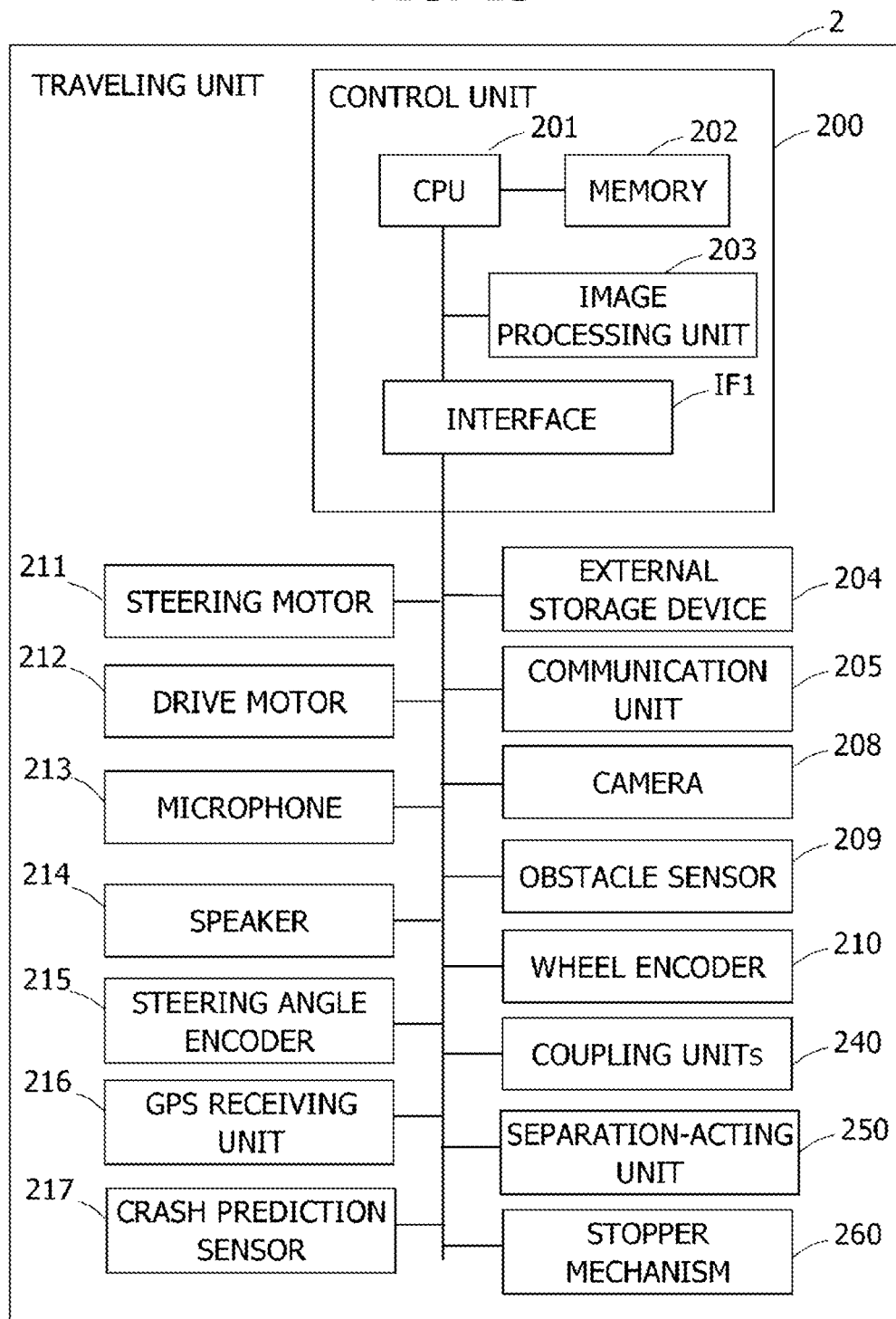
FIG. 13 is a diagram illustrating an example of a hardware configuration of the traveling unit.

FIG. 13 is a diagram illustrating an example of a hardware configuration of the traveling unit 2. In the first embodiment, it is assumed that the traveling unit 2 is an electric automatic vehicle capable of autonomous traveling. Therefore, FIG. 13 is a diagram in the case where it is assumed that the traveling unit 2 is an electric automatic vehicle capable of autonomous traveling. Note that, in FIG. 13, hardware related to a control system of the traveling unit 2 is extracted and illustrated.

The traveling unit 2 is provided, for example, with a control unit 200, an external storage device 204, a communication unit 205, a camera 208, an obstacle sensor 209, a wheel encoder 210, a steering motor 211, a drive motor 212, a microphone 213, a speaker 214, a steering angle encoder 215, a GPS (Global Positioning System) receiving unit 216, a crash prediction sensor 217, the coupling units 240, the separation-acting unit 250 and a stopper mechanism 260.

The control unit 200 is also called an electronic control unit (ECU). The control unit 200 has a CPU 201, a memory 202, an image processing unit 203 and an interface IF1. The external storage device 204, the communication unit 205, the camera 208, the obstacle sensor 209, the wheel encoder 210, the steering motor 211, the drive motor 212, the microphone 213, the speaker 214, the steering angle encoder 215, the GPS receiving unit 216 and the crash prediction sensor 217 are connected to the interface IF1. The coupling units 240, the separation-acting unit 250 and the stopper mechanism 260 are also connected to the interface IF1 according to an embodiment.

The obstacle sensor 209 is an ultrasonic sensor, a radar or the like. The obstacle sensor 209 emits ultrasonic waves, electromagnetic waves or the like in a detection target direction to detect existence, a position a relative speed and the like of an obstacle in the detection target direction based on reflected waves. As the obstacle, for example, a pedestrian, a bicycle, a structure, a building and the like are included. For example, if the traveling unit 2 is in a box shape as illustrated in FIG. 2, a plurality of obstacle sensors 209 are provided, and the plurality of obstacle sensors 209 are provided at positions near to four corners of the traveling unit 2 on the front, rear, left and right. Note that the front, rear, left and right of the traveling unit 2 are determined, for example, according to the traveling direction.

The camera 208 is an image pickup apparatus by an image sensor such as a charged-coupled device (CCD), a metal-oxide-semiconductor (MOS) or a complementary metal-oxide-semiconductor (CMOS). The camera 208 acquires an image at predetermined time intervals called a frame period and stores the image into a frame buffer in the control unit 200. The traveling unit 2 is provided with a plurality of cameras 208, and the plurality of cameras 208 are installed, for example, on side faces on the front, rear, left and right of the traveling unit 2, facing the outside of the vehicle.

The steering motor 211 controls an angle defining a direction of crossing lines where rotation surfaces of the wheels and a horizontal plane cross, that is, the traveling direction by rotation of the wheels, according to an instruction signal from the control unit 200. The drive motor 212 drives, for example, each of the wheels provided on the traveling unit 2 to cause the wheels to rotate according to an instruction signal from the control unit 200. However, the drive motor 212 may drive any one of two pairs of wheels on the front and the rear.

The steering angle encoder 215 detects a steering angle, which is the traveling direction of the wheels, at predetermined detection time intervals and stores the steering angle into a register of the control unit 200. The steering angle is an angle in a horizontal plane of rotation axes of the wheels. For example, an origin of the angle is set in a direction in which the rotation axes of the wheels are orthogonal to the traveling direction of the traveling unit 2. The wheel encoder 210 acquires a rotation angle of the wheels at predetermined detection time intervals and stores the rotation angle into a register of the control unit 200.

The communication unit 205 is a communication unit for connecting, for example, to a Wi-Fi access point or a mobile phone base station and, through a public communication network connected to the Wi-Fi access point or the mobile phone base station, communicating with various kinds of servers and the like on the network.

The communication unit 205 performs wireless communication by a wireless signal and a wireless communication method in conformity with a predetermined wireless communication standard.

The GPS receiving unit 216 receives time signal radio waves from a plurality of artificial satellites (global positioning satellites) and stores the time signal radio waves into a register of the control unit 200. The microphone 213 detects sound, converts the sound to a digital signal and stores the digital signal into a register of the control unit 200. The speaker 214 is driven by a D/A converter and an amplifier that are connected to the control unit 200 or a signal processing unit to reproduce the sound including noises and voices.

The crash prediction sensor 217 is a sensor used for crash prediction. As the crash prediction sensor, for example, a camera, a millimeter wave radar, a LIDAR, an acceleration sensor, a speed sensor and the like are included. As these sensors, for example, what are used as the obstacle sensor 209, the camera 208 and the like may be utilized.

The CPU 201 of the control unit 200 executes a computer program executably deployed on the memory 202 to execute a process as the control unit 200. The memory 202 stores the computer program to be executed by the CPU 201, and data and the like to be processed by the CPU 201. The memory 202 is, for example, a dynamic random access memory (DRAM), a static random access memory (SRAM), a read only memory (ROM) or the like. The image processing unit 203 processes data of the frame buffer obtained from the camera 208 for each predetermined frame period in cooperation with the CPU 201. The image processing unit 203 has a GPU and an image memory to be the frame buffer. The external storage device 204 is a nonvolatile storage device and is, for example, a solid state drive (SSD), a hard disk drive or the like.

For example, the control unit 200 acquires a detection signal from a sensor of each unit of the traveling unit 2 via the interface IF1. Further, the control unit 200 calculates a latitude and a longitude, which indicate a position on the earth, from a detection signal from the GPS receiving unit 216. Furthermore, the control unit 200 acquires map data from a map information database stored in the external storage device 204, and compares the calculated latitude and longitude with a position on the map data to determine a current location. Further, the control unit 200 acquires a route from the current location to a destination on the map data. Further, the control unit 200 detects an obstacle around the traveling unit 2 based on signals from the obstacle sensor 209, the camera 208 and the like and determines the traveling direction and controls the steering angle to avoid the obstacle.

Furthermore, the control unit 200 processes an image acquired from the camera 208 for each frame data in cooperation with the image processing unit 203 and detects, for example, change based on difference among images to recognize an obstacle. Note that the control unit 200 may transmit the frame data of the images from the camera 208 and sound data obtained from the microphone 213 to a server on the network from the communication unit 205. Then, the server may be caused to share analysis of the frame data of the image and the sound data.

Though the interface IF1 is illustrated in FIG. 13, transfer of signals between the control unit 200 and a control target is not limited to the interface IF1. In other words, the control unit 200 may have a plurality of signal transfer routes other than the interface IF1. Further, in FIG. 13, the control unit 200 has the single CPU 201. However, the CPU is not limited to a single processor but may be in a multi-processor configuration. Further, a single CPU connected with a single socket may have a multi-core configuration. At least a part of processes of the above units may be performed by a processor other than the CPU, for example, a dedicated processor such as a digital signal processor (DSP) and a graphics processing unit (GPU). Further, at lease a part of processes of the above units may be an integrated circuit (IC) or other digital circuits. Further, an analog circuit may be included in at least a part of the above units.

The body unit 3 is provided with a control unit, a camera, a microphone, a speaker, a GPS receiver, a communication unit and the like similar to those of the control unit 200 of the traveling unit 2. Since these are as described in the hardware configuration of the traveling unit 2, description will be omitted.

Figure 14:
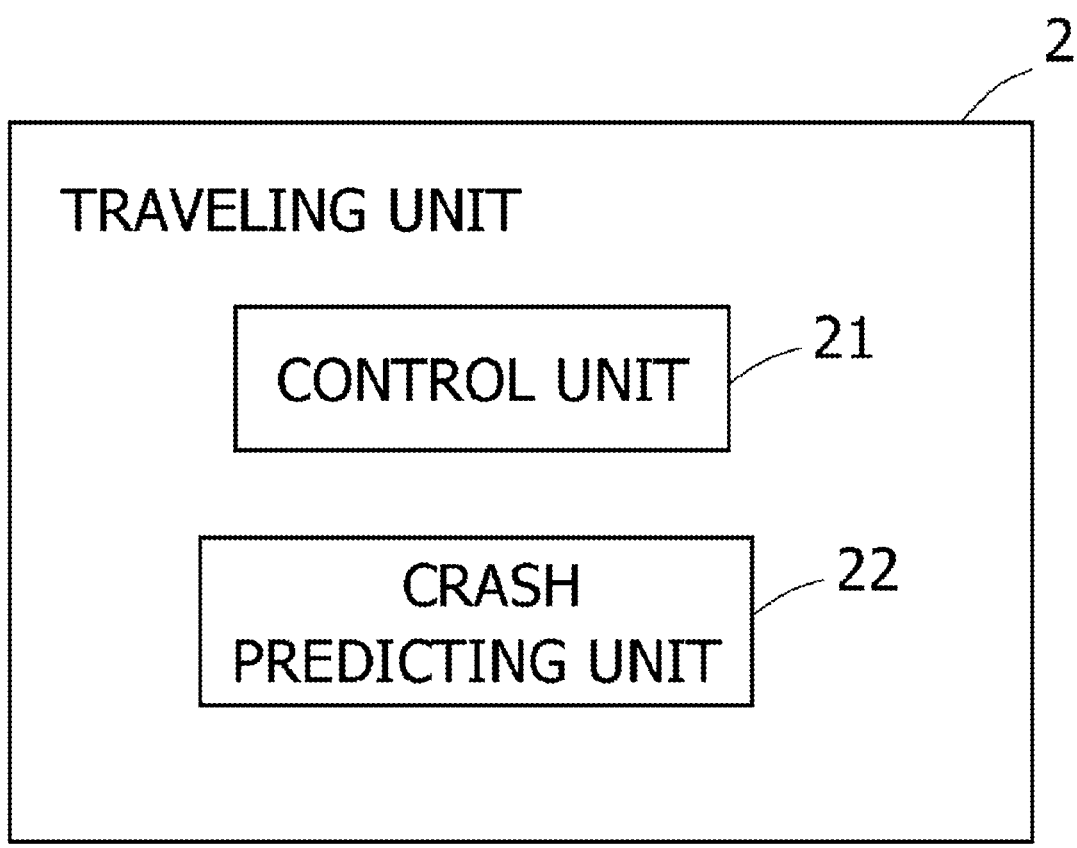
FIG. 14 is a diagram illustrating an example of functional components of the traveling unit according to the first embodiment.

FIG. 14 is a diagram illustrating an example of functional components of the traveling unit 2 according to the first embodiment. In FIG. 14, functional components related to control according to the first embodiment, that is, the crash avoidance control of the body unit 3 accompanying crash prediction is extracted and illustrated. The traveling unit 2 is provided with a control unit 21 and a crash predicting unit 22 as the functional components. These are achieved, for example, by the CPU 201 of the traveling unit 2 executing a predetermined program.

If occurrence of a crash is predicted by the crash predicting unit 22, the control unit 21 releases coupling with the body unit 3 by the coupling units 240. If control of the coupling units 340 side of the body unit 3 is also needed to release coupling between the traveling unit 2 and the body unit 3, the control unit 21 transmits a coupling releasing instruction to the body unit 3. Note that the traveling unit 2 and the body unit 3 may be enabled to transmit/receive an instruction signal, for example, by being electrically connected by contact between the coupling units 240 and the coupling units 340 or the like or may transmit/receive an instruction through direct communication by near field communication.

Next, the control unit 21 causes the separation-acting unit 250 to work. However, if the separation-acting unit 250 is a part of a structure and is not under the control of the control unit 21, it is not performed to cause the separation-acting unit 250 to work. For example, it is when the method for separating the body unit 3 illustrated in FIGS. 5 to 8 is adopted that the separation-acting unit 250 is activated by the control unit 21.

Furthermore, the control unit 21 determines whether or not the distance between the traveling unit 2 and the body unit 3 is equal to or more than a predetermined value. The control unit 21 estimates the distance between the traveling unit 2 and the body unit 3, for example, based on a detection value of a sensor such as a radar and a camera using millimeter waves, ultrasound waves or the like. However, the method for estimating the distance between the traveling unit 2 and the body unit 3 is not limited thereto.

If determining that the distance between the traveling unit 2 and the body unit 3 is equal to or more than the predetermined value, the control unit 21 causes the stopper mechanism 260 to be activated to cause a stopper to be protruded. Note that, if the stopper is such that structurally protrudes and is not under the control of the control unit 21, the process of determining the distance between the traveling unit 2 and the body unit 3 and activating the stopper mechanism is omitted. For example, it is when the method of causing a stopper to protrude by an oil hydraulic circuit illustrated in FIG. 12 is adopted that the process of determining the distance between the traveling unit 2 and the body unit 3 and activating the stopper mechanism is performed.

The crash predicting unit 22 performs crash prediction, for example, when the traveling unit 2 is operating or when the speed of the traveling unit 2 is equal to or more than a predetermined value. A method for the crash prediction may be any of existing methods. For example, crash prediction is performed by determining whether or not it is possible to stop before reaching an obstacle ahead, based on a distance to the obstacle ahead, the current speed and the like. The distance to the obstacle ahead, the speed of the traveling unit 2 and the like are acquired from detection values of various kinds of sensors. If occurrence of a crash is predicted, the crash predicting unit 22 notifies the control unit 21 of the crash occurrence prediction.

Figure 15:
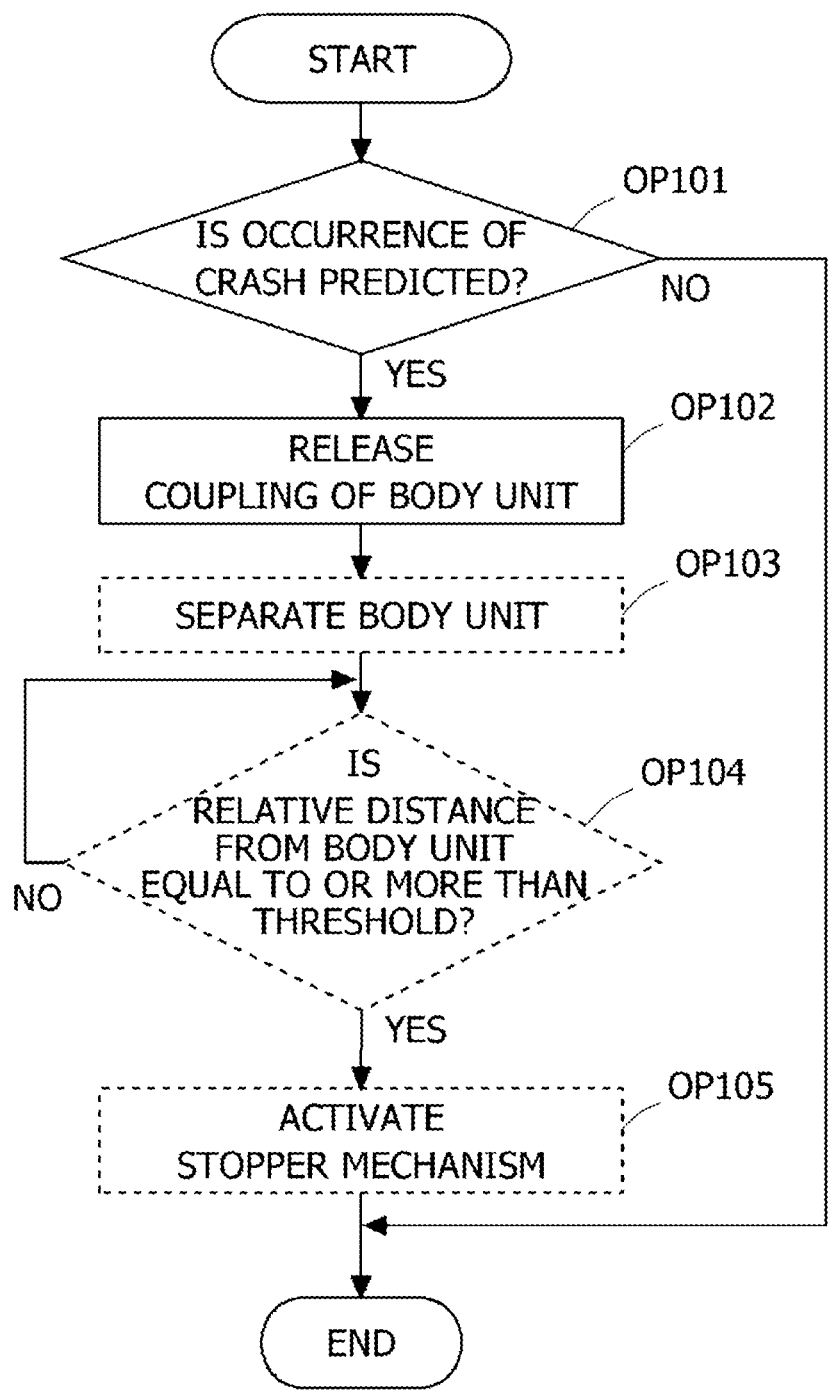
FIG. 15 is an example of a flowchart of a crash avoidance control process of the traveling unit according to the first embodiment.

FIG. 15 is an example of a flowchart of a crash avoidance control process of the traveling unit 2 according to the first embodiment. The process illustrated in FIG. 15 is repeatedly executed, for example, while the traveling unit 2 is operating, or when the speed of the traveling unit 2 is equal to or more than a predetermined value. Though a subject that executes the process illustrated in FIG. 15 is, for example, the CPU 201 of the traveling unit 2, description will be made with functional components as the subject, for convenience.

At OP101, the control unit 21 determines whether or not a crash occurrence prediction has been notified from the crash predicting unit 22. If the crash occurrence prediction has been made (OP101: YES), the process proceeds to OP102. If the crash occurrence prediction has not been made (OP101: NO), the process illustrated in FIG. 15 ends.

At OP102, the control unit 21 causes coupling with the body unit 3 by the coupling units 240 to be released. Thereby, the body unit 3 is in a state of not being fixed to the traveling unit 2.

At OP103, the control unit 21 causes the separation-acting unit 250 to work to separate the body unit 3. Note that, if the separation-acting unit 250 is a part of the structure of the traveling unit 2 and is not under the control of the control unit 21, the process of OP103 is not performed.

At OP104, the control unit 21 determines whether or not a relative distance between the traveling unit 2 and the body unit 3 is equal to or more than a threshold. If the relative distance between the traveling unit 2 and the body unit 3 is equal to or more than the threshold (OP104: YES), the process proceeds to OP105. If the relative distance between the traveling unit 2 and the body unit 3 is less than the threshold (OP104: NO), the process of OP104 is repeated. If the relative distance between the traveling unit 2 and the body unit 3 is less than the threshold even if a predetermined time passes after the process of separating the body unit 3 at OP103 is performed (OP104: NO), for example, the process illustrated in FIG. 15 may end.

At OP105, the control unit 21 causes the stopper mechanism 260 to be activated to cause the stopper to protrude. Note that, if the stopper 260 is such that structurally protrudes and is not under the control of the control unit 21, the processes of OP104 and OP105 are not performed. After that the process illustrated in FIG. 15 ends.

<Operation and Effects of First Embodiment>

In the first embodiment, when predicting occurrence of a crash, the traveling unit 2 releases coupling with the body unit 3 and separates the body unit 3. Thereby, even if the traveling unit 2 crashes, the body unit 3 can avoid the crash, or an impact of the crash can be reduced.

Further, in the first embodiment, the traveling unit 2 causes a propulsion force of the body unit 3 that travels in the traveling direction by an inertial force to be reduced by the stopper protruding upward from the top face, after separating the body unit 3, so that it is possible to cause a crash to be avoided or cause an impact of the crash to be reduced.

<Modification of First Embodiment>

In the first embodiment, it has been described that the traveling unit 2 performs crash prediction, control of release of coupling with the body unit 3, and control of separation of the body unit 3. However, regardless of this, the body unit 3 may perform the processes similar to those of the traveling unit 2 instead of the traveling unit 2. When the body unit 3 performs the processes similar to those of the traveling unit 2 described above, the body unit 3 is provided with the functions of the control unit 21 and crash predicting unit 22 of the traveling unit 2, the crash prediction sensor 217 and the separation-acting unit 250. In this case, the traveling unit 2 is provided with the separation-acted-upon unit 350. Thereby, when the body unit 3 performs crash prediction and predicts occurrence of a crash, the body unit 3 releases coupling with the traveling unit 2 and controls the separation-acting unit 250 to be separated from the traveling unit 2.

Note that the crash prediction, the control of release of coupling with the body unit 3, and the control of separation of the body unit 3 may be shared by the traveling unit 2 and the body unit 3. For example, the traveling unit 2 may perform the crash prediction, and the body unit 3 may perform control of release of coupling with the traveling unit 2 and control of separation of the traveling unit 2 in response to a notification of occurrence of a crash from the traveling unit 2. For example, the body unit 3 may perform the crash prediction, and the traveling unit 2 may perform the control of release of coupling with the body unit 3 and the control of separation of the body unit 3 in response to a notification of occurrence of a crash from the body unit 3. For example, the traveling unit 2 may perform the crash prediction and release coupling with the body unit 3 if predicting occurrence of a crash, and the body unit 3 may perform control of separation from the traveling unit 2. For example, the function of control of separation and hardware are provided in different units like a case where the traveling unit 2 performs the control of separation and the body unit 3 is provided with the separation-acting unit 250, a unit that performs the control transmits a separation instruction to a unit provided with the hardware. Note that it is in a case other than a case where separation of the body unit 3 from the traveling unit 2 structurally occurs (for example, in the case of the examples illustrated in FIGS. 5 to 8) that the control of separation is performed.

In the first embodiment, as for as the direction of separation between the traveling unit 2 and the body unit 3, the cases of performing separation in the direction opposite to the traveling direction and in the vertical upward direction have been described. However, the direction of separation between the traveling unit 2 and the body unit 3 is not limited thereto. For example, the body unit 3 may be separated either in the left or right direction relative to the traveling direction of the traveling unit 2. In this case, for example, any one of the left and right of the inclination of the top face of the traveling unit 2 relative to the traveling direction is lower than the other (see FIG. 4); the directions in which linear motors are deployed are the left and right directions relative to the traveling direction (see FIG. 5); or any one of left and right pushing directions of pushing units relative to the traveling direction of the traveling unit 2 is set (see FIG. 6).

Second Embodiment

FIG. 16 is a diagram illustrating an example of a configuration of a vehicle 1B according to a second embodiment. In the second embodiment, the vehicle 1B is a vertically separated type vehicle provided with a traveling unit 2B and a body unit 3B, the body unit 3B being mounted on the traveling unit 2B. In the second embodiment, description overlapping with the description of the first embodiment will be omitted.

In the second embodiment, when predicting occurrence of a crash, the traveling unit 2B estimates which of the left and right relative to the traveling direction the crash occurs in, and causes the body unit 3B to move in a direction opposite to the left or right relative to the traveling direction where occurrence of the crash is predicted (see a lower part of FIG. 16). Thereby, a possibility of the body unit 3B avoiding the crash becomes high.

<Method for Body Unit 3 to Move in Left and Right Directions>

Figure 17:
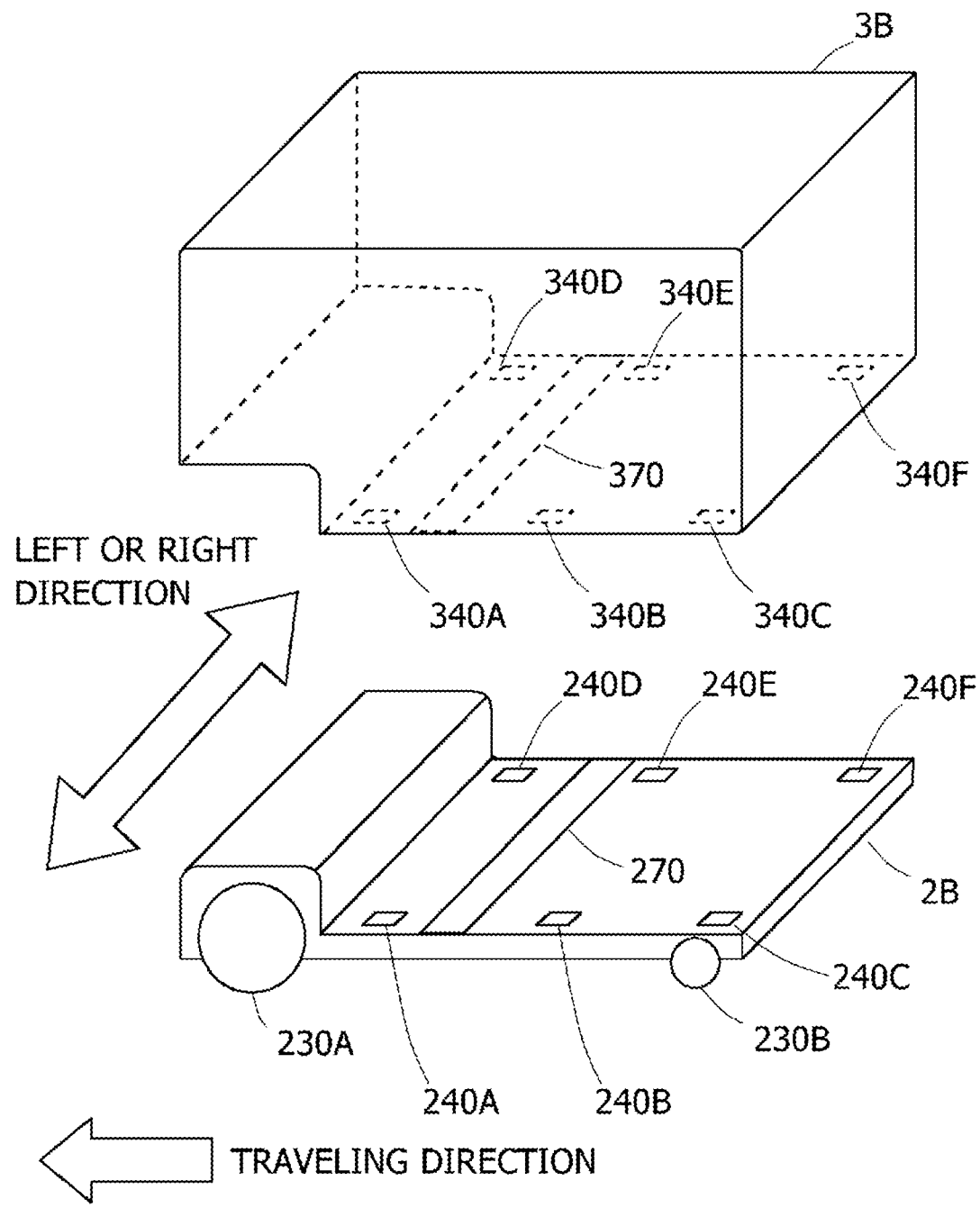
FIG. 17 is a diagram illustrating an example of causing the body unit to move in the left or right direction relative to the traveling direction on the traveling unit.
Figure 18:
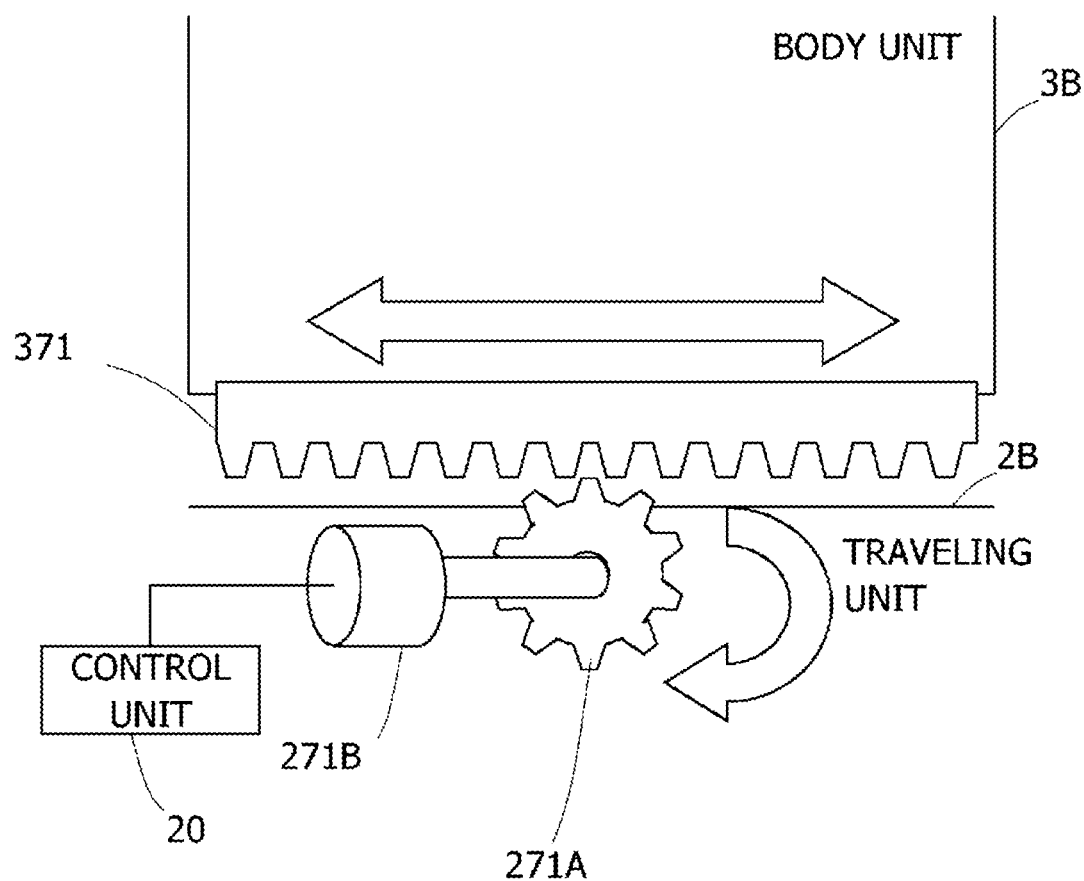
FIG. 18 is a diagram illustrating an example of causing the body unit to move in the left or right direction relative to the traveling direction on the traveling unit.

FIGS. 17 to 18 are diagrams illustrating an example of causing the body unit 3B to move in the left or right direction relative to the traveling direction on the traveling unit 2B. FIG. 17 illustrates a method for causing the body unit 3B to move in the left or right direction on the traveling unit 2B by configuring a linear motor on a contact surface between the traveling unit 2B and the body unit 3B and causing the body unit 3B to move on the traveling unit 2B by the linear motor.

In the second embodiment, the traveling unit 2B is provided with a movement-acting unit 270 on a top face. The body unit 3B is provided with a movement-acted-upon unit 370 on a bottom face. The movement-acting unit 270 and the movement-acted-upon unit 370 are installed at positions where they face each other when the body unit 3B is mounted on the traveling unit 2B. The movement-acting unit 270 is an example of "the acting unit". The movement-acted-upon unit 370 is an example of "the acted-upon unit".

In the example illustrated in FIG. 17, the movement-acting unit 270 is a coil, and the movement-acted-upon unit 370 is an electromagnet. The coil 270 and the electromagnet 370 are deployed in the left and right directions relative to the traveling direction. The coil 270 of the traveling unit 2B and the electromagnet 370 of the body unit 3B form a linear motor. When a current is applied to the coil 270, a magnetic field occurs, and the body unit 3B moves in any of the left and right directions in which the coil 270 is deployed by attracting and repelling forces between the magnetic field and the electromagnet 370 of the body unit 3B.

FIG. 18 illustrates a method for causing the body unit 3B to move to the left or right on the traveling unit 2B by a gear deployed in the left and right directions on the top face of the traveling unit 2B. In FIG. 18, relevant components of the traveling unit 2B and the body unit 3B are extracted and illustrated. In the example illustrated in FIG. 18, the traveling unit 2B is provided with a gear 271A and a driving unit 271B that causes the gear to be driven. The driving unit 271B is connected to the control unit 200. The body unit 3B is provided with a rack 371. The rack 371 is such a plate-shaped gear that a diameter of a gear is made infinite.

The driving unit 271B is, for example, a motor. When being instructed by the control unit 200, the driving unit 271B rotates in the specified direction. The gear 271A rotates by the rotation of the driving unit 271B, and the body unit 3B moves in a direction in which the gear 271A has rotated by a distance corresponding to a distance of the rotation. Since the gear 271A and the rack 371 are deployed in the left and right directions relative to the traveling direction, the body unit 3B moves in any of the left and right direction by the gear 271A rotating. In the example illustrated in FIG. 18, the gear 271A and the driving unit 271B correspond to the movement-acting unit 270, and the rack 371 corresponds to the movement-acted-upon unit 370.

Figure 19:
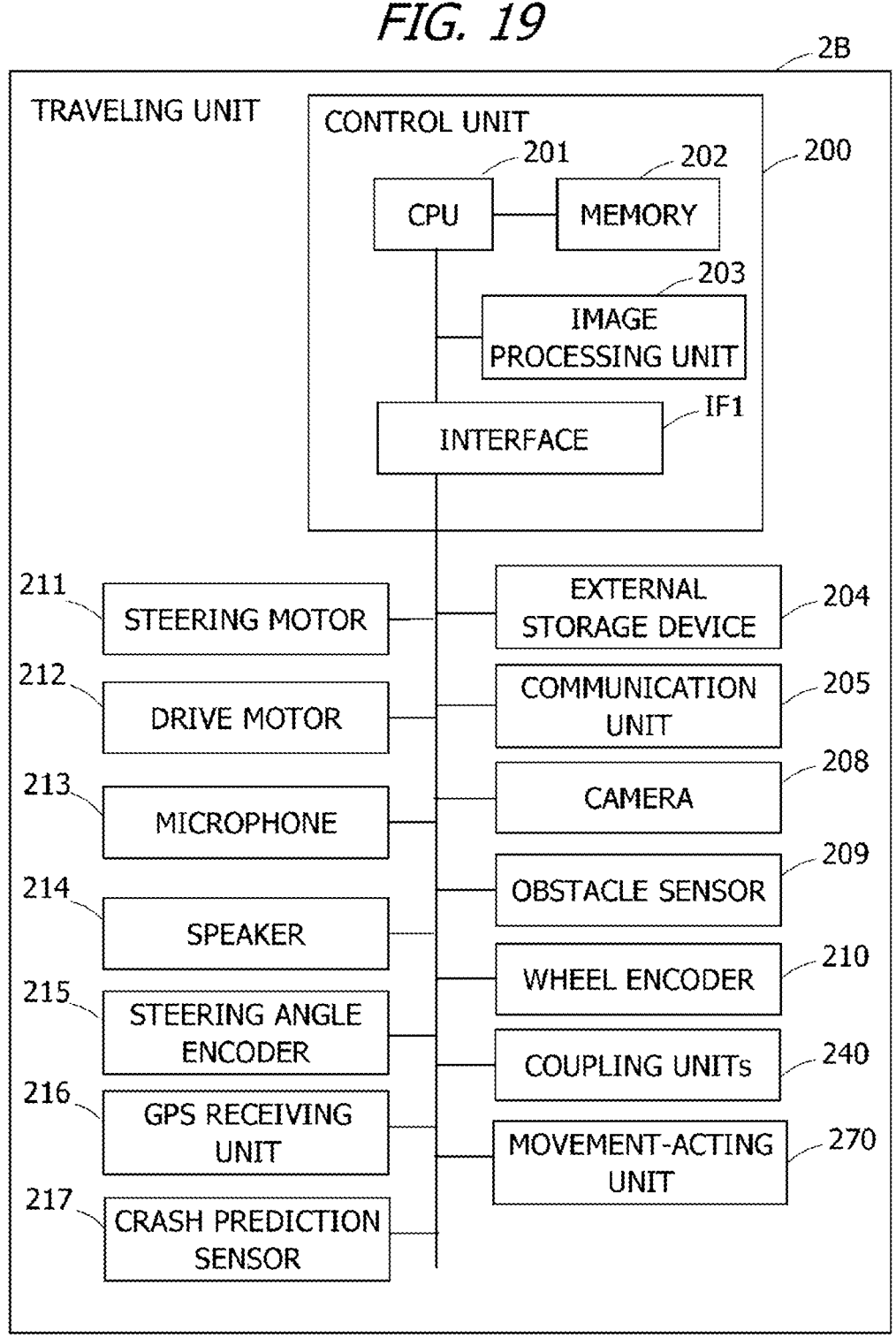
FIG. 19 is a diagram illustrating an example of a hardware configuration of the traveling unit according to the second embodiment.

FIG. 19 is a diagram illustrating an example of a hardware configuration of the traveling unit 2B according to the second embodiment. The traveling unit 2B is provided, for example, with the control unit 200, an external storage device 204, the communication unit 205, the camera 208, an obstacle sensor 209, the wheel encoder 210, the steering motor 211, the drive motor 212, the microphone 213, the speaker 214, the steering angle encoder 215, the GPS receiving unit 216, the crash prediction sensor 217, the coupling units 240 and the movement-acting unit 270. Since the control unit 200, the external storage device 204, the communication unit 205, the camera 208, the obstacle sensor 209, the wheel encoder 210, the steering motor 211, the drive motor 212, the microphone 213, the speaker 214, the steering angle encoder 215, the GPS receiving unit 216, the crash prediction sensor 217 and the coupling units 240 are similar to those of the first embodiment, description thereof will be omitted. The movement-acting unit 270 is as described in FIGS. 17 and 18.

Functional components of the traveling unit 2B according to the second embodiment are similar to those of the traveling unit 2 according to the first embodiment, and the control unit 21 and the crash predicting unit 22 are provided (see FIG. 14). If occurrence of a crash is predicted by the crash predicting unit 22, the control unit 21 estimates which of the left and right relative to the traveling direction the crash will occur in. For example, the control unit 21 estimates which of the left and right relative to the traveling direction the crash will occur in, by camera images and detection values of the radar. Between the left and the right relative to the traveling direction, a direction in which the crash occurs will be hereinafter referred to as a crash direction. Next, the control unit 21 releases coupling with the body unit 3B by the coupling units 240. Next, the control unit 21 instructs the movement-acting unit 270 to cause the body unit 3B to move in a direction opposite to the crash direction. Note that the estimation of the crash direction may be executed by the crash predicting unit 22.

Figure 20:
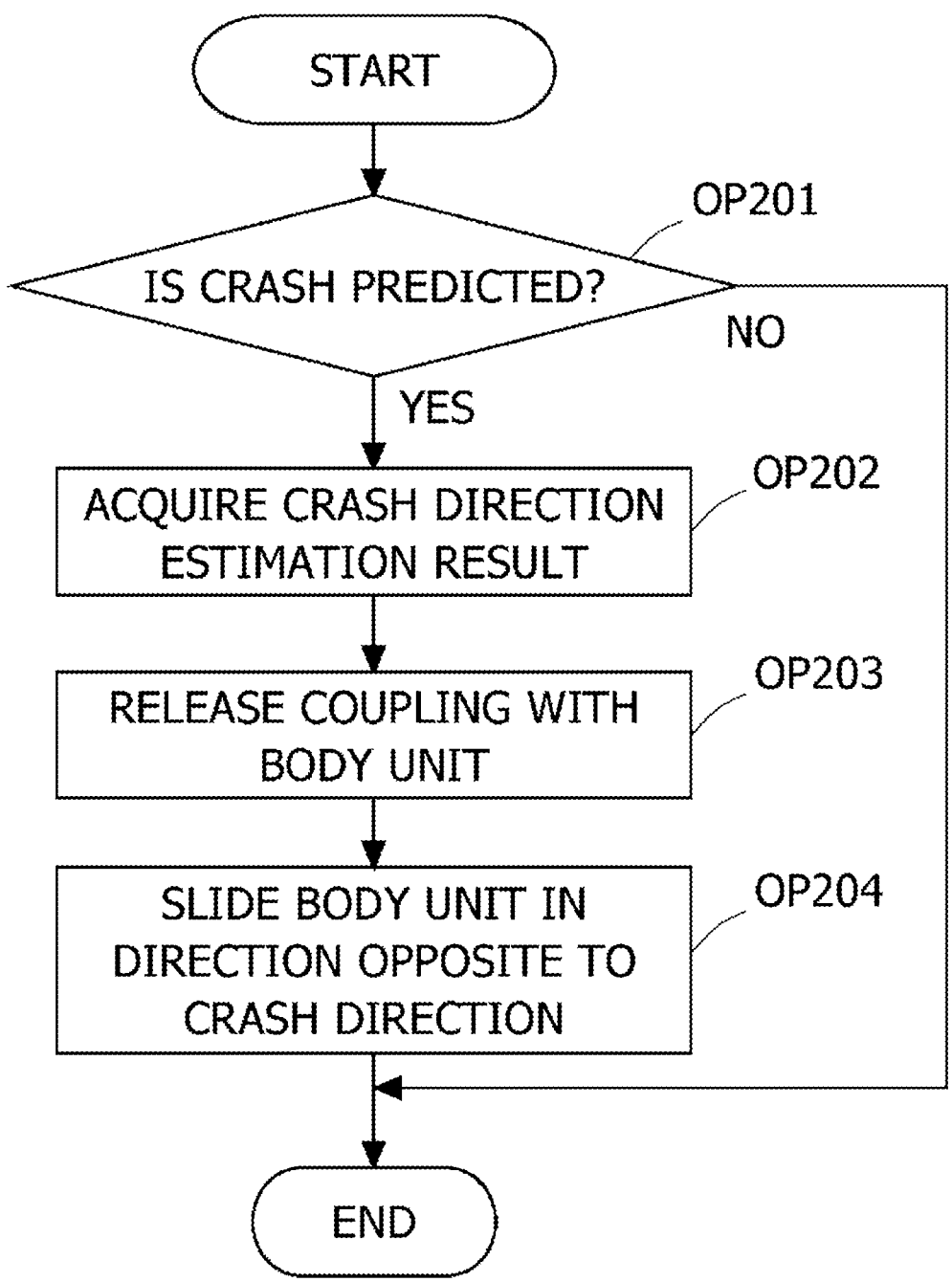
FIG. 20 illustrates an example of a flowchart of a crash avoidance control process of the traveling unit according to the second embodiment.

FIG. 20 illustrates an example of a flowchart of a crash avoidance control process of the traveling unit 2B according to the second embodiment. The process illustrated in FIG. 20 is repeatedly executed, for example, while the traveling unit 2B is operating, or when the speed of the traveling unit 2B is equal to or above a predetermined value. Though a subject that executes the process illustrated in FIG. 20 is, for example, the CPU 201 of the traveling unit 2B, description will be made with functional components as the subject, for convenience.

At OP201, the control unit 21 determines whether or not a crash occurrence prediction has been notified from the crash predicting unit 22. If the crash occurrence prediction has been made (OP201: YES), the process proceeds to OP202. If the crash occurrence prediction has not been made (OP201: NO), the process illustrated in FIG. 20 ends.

At OP202, the control unit 21 estimates a crash direction. The estimation of the crash direction is performed, for example, based on camera images, detection values of the radar and the like.

At OP203, the control unit 21 causes coupling with the body unit 3B by the coupling units 240 to be released. Thereby, the body unit 3B is in a state of not being fixed to the traveling unit 2B.

At OP204, the control unit 21 instructs the movement-acting unit 270 to cause the body unit 3B to move in the direction opposite to the crash direction. Thereby, the body unit 3B slides in the direction opposite to the crash direction. After that, the process illustrated in FIG. 20 ends.

<Operation and Effects of Second Embodiment>

In the second embodiment, when predicting occurrence of a crash, the traveling unit 2B causes the body unit 3B to move in a direction opposite to a direction in which occurrence of the crash is predicted, between the left and right directions relative to the traveling direction. Thereby, it is possible to cause the body unit 3B to avoid the crash or reduce an impact of the crash on the body unit 3B.

<Modification of Second Embodiment>

Though the traveling unit 2B performs crash prediction, estimation of a crash direction, control of movement of the body unit 3B and the like in the second embodiment, these processes may be executed by the body unit 3B or may be shared by the traveling unit 2B and the body unit 3B. For example, by being provided with the functions of the control unit 21 and crash predicting unit 22 of the traveling unit 2B, the crash prediction sensor 217 and the movement-acting unit 270, the body unit 3B can perform the crash prediction, the estimation of a crash direction and the control of movement of the body unit 3B. Further, in this case, the traveling unit 2B is provided with the movement-acted-upon unit 370. Thereby, when the body unit 3B performs the crash prediction and predicts occurrence of a crash, the body unit 3B estimates a crash direction and controls the movement-acting unit 270 so that the body unit 3B moves on the traveling unit 2B in a direction opposite to the crash direction.

Other Embodiments

The embodiment described above is an example, and the present disclosure may be changed and carried out as appropriate without departing from the gist of the present disclosure.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. A vehicle system comprising:
a body unit;
a traveling unit capable of traveling with the body unit being mounted thereon;
coupling units configured to couple the body unit and the traveling unit;
a sensor used for predicting a crash;
a controller configured to execute causing coupling between the traveling unit and the body unit by the coupling units to be released when a crash is predicted based on a detection value of the sensor;
an acting unit provided on one of the traveling unit and the body unit and configured to act so that a positional relationship between the body unit and the traveling unit is changed when the coupling is released; and
an acted-upon unit provided on the other between the traveling unit and the body unit and configured to receive action of the acting unit,
wherein the traveling unit further includes a stopper for suppressing the body unit from traveling in a traveling direction of the traveling unit more than the traveling unit by an inertial force applied in the traveling direction after being separated from the body unit, by protruding upward from a top face of the traveling unit.

2. The vehicle system according to claim 1, wherein, when the coupling is released, the acting unit acts on the acted-upon unit so that the body unit is separated in a predetermined direction relative to the traveling unit.

3. The vehicle system according to claim 2, wherein
the acting unit is provided on one of the top face of the traveling unit and a bottom face of the body unit;
the acted-upon unit is provided on the other between the top face of the traveling unit and the bottom face of the body unit;
the acting unit and the acted-upon unit are formed by a material that a friction coefficient on a contact surface where the acting unit and the acted-upon unit are in contact with each other is below a predetermined value; and
when the coupling is released, the body unit is separated in a direction opposite to a traveling direction of the traveling unit relative to the traveling unit.

4. The vehicle system according to claim 2, wherein
the acting unit is provided on a top face of the traveling unit and is in a shape inclined to be gradually lower toward the predetermined direction; and
the acted-upon unit is provided on a bottom face of the body unit and in a shape inclined according to the inclined shape of the acting unit.

5. The vehicle system according to claim 2, wherein
the acting unit is provided on one of a top face of the traveling unit and a bottom face of the body unit;
the acted-upon unit is provided on the other between the top face of the traveling unit and the bottom face of the body unit, facing the acting unit;
the acting unit and the acted-upon unit form a linear motor deployed in the predetermined direction together; and
the controller is configured to cause the linear motor to work so as to cause the body unit to move in the predetermined direction relative to the traveling unit after the coupling is released.

6. The vehicle system according to claim 2, wherein
the acting unit is one or more gas injecting units configured to inject predetermined gas in a direction that the body unit is separated in the predetermined direction relative to the traveling unit; and
the controller is configured to cause the predetermined gas to be injected from the one or more gas injecting units after the coupling is released.

7. The vehicle system according to claim 2, wherein
the acting unit includes a pushing unit, comprising at least one arm, configured to push out the body unit in such a direction that the body unit is separated in the predetermined direction relative to the traveling unit by a command; and the controller is configured to output a command to activate the pushing unit, to the acting unit after the coupling is released.

8. The vehicle system according to claim 1, wherein
the stopper includes an inclined face that is gradually higher from a front end part on the traveling direction side toward a rear end part on a side opposite to the traveling direction side, and a vertical face substantially orthogonal to the top face, the vertical face connecting to the rear end part of the inclined face;
a bottom face of the body unit is in a shape with which the stopper is fitted; and
in a state in which the body unit is mounted on the traveling unit, the body unit moves in a direction opposite to the traveling direction more easily than in the traveling direction.

9. The vehicle system according to claim 1, wherein
the stopper is accommodated in the traveling unit;
the traveling unit further includes a power giving unit, comprising at least one of an oil hydraulic circuit or a spring, configured to give power for causing the stopper to protrude, to the stopper; and
when a distance of the body unit relative to the traveling unit is equal to or more than a predetermined value, the controller is configured to control the power giving unit to execute causing the stopper to protrude from the traveling unit.

10. The vehicle system according to claim 1, wherein
the traveling unit further includes an elastic body configured to bias the stopper;
the stopper is suppressed from protruding from the top face by weight of the body unit mounted on the traveling unit being applied to the elastic body; and
the stopper protrudes from the traveling unit by an elastic force given by the elastic body, by a distance of the body unit relative the traveling unit becoming equal to or more than a predetermined value.

11. A traveling unit capable of traveling with a body unit being mounted thereon, the traveling unit comprising:
coupling units configured to be coupled with the body unit;
a sensor used for predicting a crash;
a controller configured to execute causing coupling with the body unit by the coupling units to be released when a crash is predicted based on a detection value of the sensor; and
an acting unit configured to act so that a positional relationship with the body unit is changed when the coupling is released,
wherein the traveling unit further including a stopper for suppressing the body unit from traveling in a traveling direction of the traveling unit more than the traveling unit by an inertial force applied in the traveling direction by protruding from a top face of the traveling unit.

12. The traveling unit according to claim 11, wherein, when the coupling is released, the acting unit acts on an acted-upon unit provided on the body unit so that the body unit is separated in a predetermined direction relative to the traveling unit.

13. The traveling unit according to claim 12, wherein the acting unit is provided on a top face of the traveling unit;
the acted-upon unit is provided on a bottom face of the body unit, facing the acting unit;
the acting unit and the acted-upon unit form a linear motor deployed in the predetermined direction together; and
the controller is configured to cause the linear motor to work so as to cause the body unit to move in the predetermined direction after the coupling is released.

14. The traveling unit according to claim 12, wherein
the acting unit includes a pushing unit, comprising at least one arm, configured to push out the body unit in the predetermined direction by a command; and
the controller is configured to output a command to activate the pushing unit, to the acting unit after the coupling is released.

* * * * *